United States Patent
Toda et al.

(10) Patent No.: US 7,227,818 B1
(45) Date of Patent: Jun. 5, 2007

(54) MAGNETO-OPTICAL DATA RECORDING/REPRODUCING METHOD

(75) Inventors: Tsuyoshi Toda, Kodaira (JP); Takeshi Maeda, Kokubunji (JP); Fumio Kugiya, Hachioji (JP); Hiroshi Ide, Kodaira (JP); Hiroyuki Tsuchinaga, Odawara (JP); Fumiyoshi Kirino, Tokyo (JP); Toshimitsu Kaku, Sagamihara (JP); Kazuo Shigematsu, Saitama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/436,490

(22) Filed: May 8, 1995

Related U.S. Application Data

(63) Continuation-in-part of application No. 08/087,777, filed on Jul. 9, 1993, now Pat. No. 5,642,343.

(30) Foreign Application Priority Data

| Nov. 11, 1991 | (JP) | 3-294145 |
| Feb. 13, 1992 | (JP) | 4-026508 |
| Feb. 13, 1992 | (JP) | 4-026509 |
| Feb. 13, 1992 | (JP) | 4-026511 |
| Apr. 21, 1992 | (JP) | 4-100897 |
| Jan. 13, 1993 | (JP) | 5-003887 |
| May 18, 1994 | (JP) | 6-104102 |
| Jun. 15, 1994 | (JP) | 6-132784 |
| Jun. 24, 1994 | (JP) | 6-142866 |

(51) Int. Cl.
 *G11B 7/00* (2006.01)
(52) U.S. Cl. ............... 369/44.29; 369/47.53
(58) Field of Classification Search ............ 369/44.29, 369/47.53
See application file for complete search history.

(56) References Cited

U.S. PATENT DOCUMENTS

| 5,070,495 | A | * | 12/1991 | Bletscher, Jr. et al. ...... 369/116 |
| 5,251,194 | A | * | 10/1993 | Yoshimoto et al. ...... 369/44.34 |
| 5,293,366 | A | * | 3/1994 | Ohta ...................... 369/44.31 |
| 5,440,534 | A | * | 8/1995 | Eastman et al. ......... 369/44.31 |
| 5,442,609 | A | * | 8/1995 | Yanagawa ................ 369/44.31 |
| 5,495,466 | A | * | 2/1996 | Dohmeier et al. ....... 369/44.31 |

FOREIGN PATENT DOCUMENTS

| JP | 3-22223 | 1/1991 |

\* cited by examiner

*Primary Examiner*—Wayne Young
(74) *Attorney, Agent, or Firm*—Mattingly, Stanger, Malur & Brundidge, P.C.

(57) ABSTRACT

A method of recording data into a recording medium by forming a recording region which is physically different from the nonrecorded portions is disclosed. The optical data recording/reproducing method includes a first trial writing operation in which trial writing data are recorded into the recording medium while changing the recording power conditions, the recorded trial writing data are reproduced, and the reproduced trial writing data are evaluated to set an optimum recording power. The method also includes a second trial writing operation in which trial writing data are recorded into the recording medium while changing the servo conditions, the recorded trial writing data are reproduced, and the reproduced trial writing data are evaluated to set optimum servo conditions.

15 Claims, 17 Drawing Sheets

FIG. 20

| | ZONE | Pa | Pw1 | Pw2 | SLOPE |
|---|---|---|---|---|---|
| OUTER | 0 | Pa (0) | Pw1 (0) | Pw2 (0) | $X_0$ |
| | ⋮ | ⋮ | ⋮ | ⋮ | ⋮ |
| MEDIUM | 15 | Pa (15) | Pw1 (15) | Pw2 (15) | $X_{15}$ |
| | ⋮ | ⋮ | ⋮ | ⋮ | ⋮ |
| INNER | 29 | Pa (29) | Pw1 (29) | Pw2 (29) | $X_{29}$ |

MAGNETO-OPTICAL DATA RECORDING/REPRODUCING METHOD

This is a Continuation-In-Part application of Ser. No. 08/087,777 filed Jul. 9, 1993, now U.S. Pat. No. 5,642,343, the disclosure of which is hereby incorporated by reference.

BACKGROUND AND SUMMARY OF THE INVENTION

The present invention relates to a data recording/reproducing apparatus for recording data onto, or reproducing data from, a recording medium. More particularly, the invention relates to a method of highly precisely recording and reproducing recording marks relying upon thermal recording and to an apparatus therefor.

In a conventional recording system as disclosed in Japanese Patent Laid-Open No. 22223/1991, a sequence of recording codes of recording marks are converted into pulses to form a sequence of pulses corresponding to the length of the sequence of recording codes. The length and amplitude of the sequence of pulses are controlled depending upon the length of an opposite phase of the sequence of recording codes located just before the sequence of recording codes. The sequence of pulses is divided into three parts, and the widths of the pulses are changed to execute the recording.

In the above-mentioned prior art, however, no attention has been given to the fact that the recording sensitivity of the recording medium changes due to a change in the thickness of the recording medium or a change in the ambient temperature, and that a relative recording sensitivity changes due to a change in the position of a light spot of the recording/reproducing apparatus. Therefore, the recording mark is not highly precisely controlled causing the recording capacity to decrease. The object of the present invention is to minimize the change of the recording mark caused by a change in the recording sensitivity and to control the recording mark highly precisely.

In order to improve matching between the recording medium and the recording apparatus according to the present invention, trial writing is effected in advance into a predetermined position of the recording medium. Optimum light powers for recording during the recording and optimum servo conditions are found from reproduction signals obtained by the trial writing and, then, the recording of normal data is started.

The trial writing data and a sequence of input data bits of normal data are converted into a sequence of codes that correspond to a modulation system of the recording apparatus. It is desired to form a sequence of data to record the sequence of codes into the recording medium, and drive a laser beam source of to form a recording area in the recording medium thereby to effect correct recording. This makes it possible to handle the trial writing data and normal data using a common circuit.

When data are to be recorded into, and erased from, the recording medium using two or more energy levels, it is desired that the light power is optimized during the recording for each of the energy levels. This constitution makes it possible to further improve matching between the recording/reproducing apparatus and the recording medium, so that the data can be reliably recorded and erased.

The present invention compensates for a change in the recording sensitivity that is caused by a change in the thickness of each of the recording medium, by a change in the ambient temperature and by a change in the characteristics of the recording apparatus. For this purpose, a predetermined trial writing pattern having a severe recording condition is written into the recording medium prior to recording normal data. In order to detect an optimum light power for recording, the recording operation is carried out while changing the light intensity or the energy of the waveform for recording, and the recorded data are reproduced and are evaluated to determine an optimum light power for recording. Moreover, the condition for controlling the position of light spot, such as focusing, tracking, etc., changes accompanying a change in the characteristics of the recording apparatus. Therefore, the trial writing pattern is recorded while changing the condition for controlling the position of the light spot, and the trial writing pattern is reproduced to determine optimum control conditions. In practice, first, an optimum light power for recording is roughly set and, then, the condition for controlling the position of the light spot is set. As the condition for controlling the position of the light spot changes, the optimum light power for recording changes, too. Therefore, the light power for recording is set again in order to eliminate erroneous operation in recording the data caused by a change in the recording sensitivity and to effect the recording and reproduction maintaining improved reliability.

When the data recorded using other apparatus are to be reproduced, it is desired to prevent as much erroneous operation as possible during the reproduction caused by variance in the characteristics between the apparatuses. For this purpose, trial reading is effected to reproduce a predetermined pattern prior to reproducing normal data, and the reproducing condition is set based upon the result of trial reading in order to improve matching between the recording marks and the reproducing apparatus.

In this specification, pits formed in the optical recording medium by the irradiation of light, magnetic recording domain, change in the phase and change in the color are all referred to as recording marks.

In the optical recording, the optical recording medium is irradiated with a laser spot of a diameter of about 1 μm to locally heat that part in order to form a recording mark of a binary code. In the case of the magneto-optical recording, however, the recording is usually effected by being irradiated with a laser spot and by the application of an external magnetic field in combination.

The system for recording data for the binary coded data includes an inter-mark recording system and a mark length recording system. As for the data "010010", for instance, the former system gives a mark relying upon the optical spot onto a central portion of the data "1" and the data "0" is placed between the two marks corresponding to two "1s". In the latter system, the mark is raised relying upon the light spot at the central position upon the arrival of the first "1", the mark is lowered at the center when the next "1" has arrived, and the mark is raised when "1" after the next "1" has arrived. That is, the data "0" is placed between the two edges between the raising of the mark and the lowering of the mark.

As a record control method which easily accomplishes high precision by utilizing a mark length recording system, the present inventors have previously proposed a method of controlling record into a magneto-optical disk by controlling the output of laser beam by superposing a plurality of kinds of pulses having different pulse widths and pulse levels (Japanese Patent Application No. 238276/1992).

FIG. 19 schematically illustrates this method, wherein FIG. 19a is a diagram illustrating laser outputs for making a record into a magneto-optical disk, FIG. 19b is a diagram illustrating a temperature distribution of the magneto-optical disk heated upon the irradiation with a laser beam, and FIG. 19c is a diagram showing recording marks recorded into the magneto-optical disk.

A minimum level in the laser beam output is a light power Pr during the reproduction. The power level Pa is such that the magneto-optical recording medium is heated to some extent even during the rest period of a sequence of recording codes and that the temperature distribution is maintained constant at a moment of the rise of the recording pulse for writing the next recording mark. The recording pulses consist of a relatively broad head pulse 40 and relatively narrow one or a plurality of succeeding pluses 41. The head pulse 40 has a recording power level Pw1 and the succeeding pulses 41 have a recording power level Pw2.

The temperature is raised by the head pulse 40 in the laser beam output waveform shown in FIG. 19a, and the temperature is maintained nearly constant by the succeeding pulses 41. Therefore, the temperature distribution corresponding to the recording pulse irradiation period and the rest period can be controlled to be constant, and the temperature distribution is imparted to the disk medium as shown in FIG. 19b. Thus, by setting the temperature level of the magneto-optical recording medium to be constant, the width and length of the recording mark are controlled to be within a predetermined precision shown in FIG. 19c.

According to the above-mentioned recording method, the temperature distribution is maintained nearly constant on the magneto-optical recording medium during the irradiation with recording pulses, and the high-density recording is accomplished maintaining high precision.

Even by the above-mentioned recording method, however, a change in the power supply which feeds electric power to the recording apparatus results in a change in the recording power or in the width of the recording pulse, which is a cause of change in the recording sensitivity for the recording medium, making it difficult to utilize the above-mentioned advantage to a sufficient degree.

In the inter-mark recording system, even a slight change in the width of the recording pulse or in the power level simply results in a change in the size of the mark in the form of a concentric circle without almost causing the center position of the recording mark to be deviated, and no problem arises. In the case of the mark length recording system, on the other hand, the mark length for recording the data undergoes a change, which is much of a problem.

The object of the present invention is to suppress as much as possible the change in the recording mark caused by a change in the power supply in the optical recording apparatus, and to control the recording mark maintaining high precision.

Another object of the present invention is to increase reliability of the optical recording apparatus in order to increase the storage capacity and the transfer rate of the data.

The above-mentioned object is accomplished by detecting the power supply voltage applied to the optical recording apparatus, and by changing the light source drive pulse, i.e., by changing the power level of the light pulse maintaining a predetermined relationship depending upon the power supply voltage that is detected. It is desired that the power supply voltage is detected at least prior to starting the recording operation.

The above-mentioned recording method can be adapted to the mark length recording system which is constituted by a relatively broad head pulse that rises in synchronism with the rise of a recording code period in the sequence of recording codes and relatively narrow one or a plurality of succeeding pulses of which the final falling portion is in synchronism with the fall of the recording code period.

The power level of the light pulse is controlled by so controlling the power level of the succeeding pulses that the ratio of the power level of the succeeding pulses to the power level of the head pulse assumes a value that has been determined in advance depending upon the power supply voltage.

When the data are to be recorded by the ZCAV (zoned constant angular velocity) system in which a reference clock is changed for each of the zones to maintain the recording density nearly constant in the inner and outer circumferences, it is desired that the ratio of the power level of the succeeding pulses to the power level of the head pulse determined in advance depending upon the power supply voltage is changed depending upon the recording position in the radial direction of the optical recording medium.

According to the present invention, the optical recording apparatus comprises a source of laser beam, an optical system for converging the light beam from the source of laser beam onto an optical recording medium, a recording waveform forming means for forming a sequence of recording pulses including a relatively broad rectangular head pulse that rises in synchronism with the rise of the recording code period based upon the recording code sequence data and relatively narrow one or a plurality of succeeding rectangular pulses, the final falling portion of which being in synchronism with the falling of the recording code period, a laser drive means for driving the source of laser beam using the sequence of recording pulses formed by the recording waveform forming means, a power supply voltage detecting means, and a means for compensating a change in the power supply voltage to compensate, depending upon the power supply voltage detected by the power supply voltage detecting means, the power level of a light pulse generated from the source of laser beam in response to the rectangular head pulse and the succeeding rectangular pulses, whereby a change in the power supply voltage is compensated to form recording marks maintaining high precision.

Means for compensating a change in the power source may include means for controlling the power level of light pulses generated from the source of laser beam in response to the succeeding rectangular pulses, so that the ratio of the power level of light pulses generated from the source of laser beam in response to the succeeding rectangular pulses to the power level of a light pulse generated from the source of laser beam in response to the rectangular head pulse, assumes a value that has been determined in advance depending upon the power supply voltage.

When the optical recording is the magneto-optical recording, the optical recording apparatus includes an external magnetic field application means, and the recording is effected by being irradiated with a light spot and by the application of a magnetic field from the external unit in combination.

The present invention can be applied not only to a recording system which records the data using light pulses of a plurality of kinds having different pulse widths and power levels but also to a recording system which effects the recording using light pulses, as well as to recording systems other than the mark length recording system.

A change in the power supply voltage during the optical recording results in a change in the drive current characteristics and drive frequency characteristics of the laser driver. In particular, a high drivability is required as the recording frequency increases. When the supply voltage drops, therefore, the rising time of the recording waveform is delayed.

As the recording frequency increases, the recording pulse width becomes narrow, the total recording power decreases, and it is no longer possible to correctly record the data. Furthermore, the recording power (crest value) tends to decrease. When the applied voltage is high, on the other hand, the recording power becomes too great and the data are not correctly recorded.

As shown in FIG. 14, for instance, when the voltage of the power supply applied to the optical recording apparatus is as represented by a solid line 320 which is that of the waveform of practical laser drive pulses of a rated power supply voltage, the waveform of the laser drive pulses changes as represented by a broken line 330 when the power supply voltage is lowered. The power of light pulse generated from the source of laser beam changes like the waveform of the laser drive pulses. The effective energy that contributes to the optical recording is the energy before the power reaches the highest value; i.e., the energy in the falling portion after the power has reached the highest point does not much contribute to the recording.

The effect of a change in the power supply voltage, in the case of the sequence of recording pulses of FIG. 19a, appears conspicuously for the succeeding pulses 41 which determine the rear end position of the recording mark 23. When the power of the succeeding pulses 41 changes, the length of the recording mark changes, which results in the occurrence of erroneous recording. When the recording method called ZCAV (zoned constant angular velocity) is employed in which the reference clock is changed for each of the zones so that the recording density is nearly constant in the inner and outer circumferences in order to increase the recording capacity, the above-mentioned effect becomes more serious since the recording frequency becomes higher toward the outer circumferential portion of the recording medium than in the inner circumferential portion.

As described above, a change in the power supply voltage appears as a change in the width of the pulse for driving the source of light and as a change in the power level. According to the present invention, the power level only is not simply rendered to become constant but also a change in the pulse width is reflected in controlling the power level, so that the power that contributes to the recording becomes constant. The amount of change in the recording power due to a change in the power supply that supplies power to the recording apparatus and the amount of change in the average recording power due to a change in the recording pulse width, are measured in advance, and the setpoint value of the recording power is changed depending upon the change in the power supply voltage, so that the recording medium is irradiated with nearly the same recording power irrespective of a change in the power supply voltage.

In practice, the recording power and a decrease in the irradiation power caused by a change in the recording pulse width are measured for each of the apparatuses, and a power level of light pulses that offsets the change is found. The power source voltage and the setpoint power level of light pulses are stored in the recording apparatus, an optimum power level of drive pulses is set to the recording apparatus from a relationship between the power supply voltage and the preset power level of light pulses based upon the voltage measured by a power supply voltage measuring device in the recording apparatus, and the recording power is irradiated with nearly the same recording power at all times irrespective of a change in the power supply voltage. This makes it possible to improve matching between the recording medium and the recording apparatus despite a change in the power supply voltage, and erroneous operation can be avoided.

Even when the power supply voltage is raised, the setpoint power level of pulses for driving the light source is lowered in the recording apparatus, so that the recording medium is irradiated with an optical recording power avoiding erroneous operation.

According to the present invention, the recording marks can be recorded highly precisely making it possible to improve reliability of the optical recording apparatus. Moreover, owing to their high recording precision, the recording marks can be densely recorded to increase the recording density and the rate for transferring the data.

BRIEF DESCRIPTION OF THE DRAWINGS

FIG. 20 is a chart of coefficients of compensation for the zones.

DETAILED DESCRIPTION OF THE INVENTION

An embodiment of the present invention will now be described. The invention can be adapted to an optical recording of the type in which data pits are formed in a recording film made of an alloy or an organic pigment material by changing the shape thereof, to a magneto-optical recording in which magnetic recording domains are formed in the magneto-optic recording material, to an optical recording in which two states of a crystalline phase and a noncrystalline phase are corresponded to the recording marks, to an optical recording which utilizes photochromism or photochemical burning of organic compound materials, and to all optical recordings which record data marks by causing a change in the optical recording medium by irradiating it with a light spot. In the following description, the invention will be described in detail with reference to an embodiment of magneto-optical recording.

Figure 1:
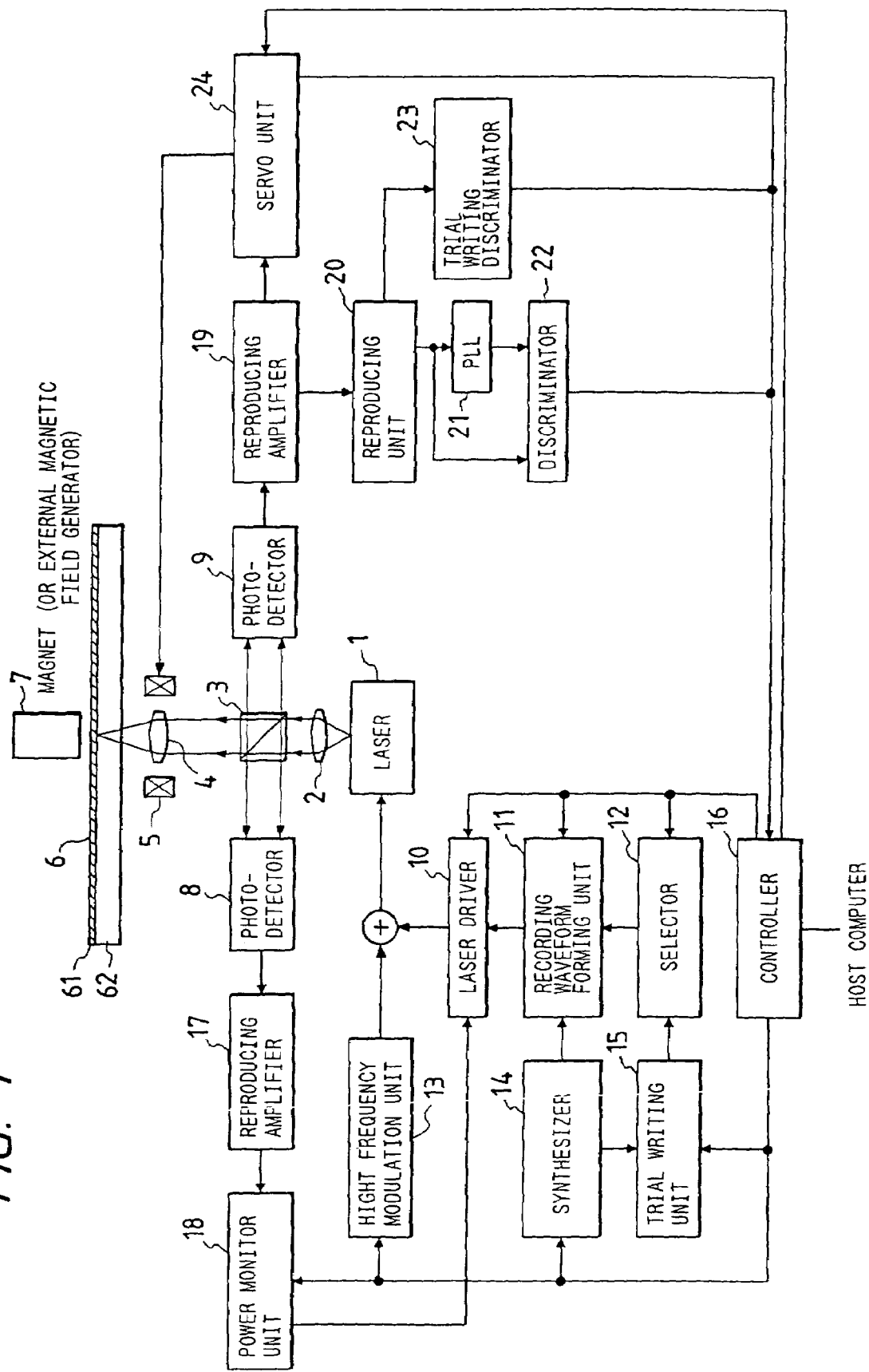
FIG. 1 is a block diagram illustrating a first embodiment of the present invention.

FIG. 1 illustrates the constitution of an optical disk device according to an embodiment of the present invention which comprises an optical head including a source 1 of laser beam, a recording medium 6 for storing data, a record processing system including a recording waveform forming unit 11, and a reproduction processing system including a reproducing unit 20 which converts the reproduction signals obtained from the optical head into data. The recording medium 6 is constituted by a recording film 61 and a substrate 62 for holding it.

Commands and data from a high-order host computer are subjected to the decoding or to the demodulation of the recorded data through a controller 16, and are converted into a sequence of codes corresponding to the demodulation system. A synthesizer 14 is an oscillator for oscillating reference clocks for the whole apparatus. When there is employed a recording method called ZCAV (zoned constant angular velocity) in which a reference clock is changed for each of the zones so that the recording density becomes nearly constant in the inner and outer circumferences, the frequency of oscillation of the synthesizer 14 must be changed depending upon the zones.

In order to improve matching between the recording medium 6 and the recording apparatus in the optical disk device of this embodiment, a trial writing pattern is written into a predetermined position of the recording medium 6 in order to detect a change in the recording sensitivity for the recording medium caused by a change in the thickness of the recording medium when it is replaced, caused by a change in the ambient temperature or caused by a change in the characteristics of the recording apparatus, prior to recording normal data. The trial writing pattern is reproduced and is evaluated, optimum recording conditions are set and, then, normal recording is executed. The recording conditions to be optimized according to the present invention include light power during the recording, focusing, and conditions of the tracking servo system.

The recording operation will now be described. The trial writing pattern has been converted into a sequence of codes corresponding to the modulation system, and is generated by a trial writing unit 15. The sequence of codes modulated depending upon the normal data from the controller 16 and the sequence of codes from the trial writing unit 15 are input to a selector 12 where they are changed over to the trial writing processing or the ordinary recording processing depending upon a control signal from the controller 16.

The sequence of codes from the selector 12 is input to the recording waveform forming unit 11 where it is converted into a sequence of recording pulses for controlling the length and width of the recording marks. The sequences of recording pulses is input to a laser driver 10, the source 1 of laser beam is oscillated with a large power by a recording current from the laser driver 10, the light emitted from the source 1 of laser beam travels as a parallel beam through a lens 2, passes through a prism 3, and is converged on the recording medium 6 through the lens 4, so that recording marks corresponding to the sequence of codes are recorded. A high-frequency superposing unit 13 is provided to lower the laser noise produced by the source 1 of laser beam. The high-frequency superposition will not be often effected during the recording or the erasing from the standpoint of the life of the source of laser beam. The selector 12 is switched to change over the ordinary recording operation and the trial writing operation of the present invention.

The reproducing operation will be described below. The source 1 of laser beam is oscillated with a small power, so that the beam is incident on the recording medium 6. The light reflected by the prism 3 partly falls on a photo detector 8. The output signal of the photo detector 8 is amplified through a reproducing amplifier 17 and is input to the power monitor unit 18. In order to maintain nearly constant the laser power during the reproduction, a control signal from the power monitor unit 18 is input to the laser driver 10 and the laser drive current is so controlled that the power of the source of laser beam becomes constant. Thus, the power of the source of laser beam can be controlled to become constant irrespective of a change in the power supply voltage that drives the laser driver.

The light reflected by the recording medium 6 is separated for its optical path through the prism 3 and is permitted to fall on a photo detector 9. The output signal of the photo detector 9 is amplified through a reproducing amplifier 19 and is input to a reproducing unit 20 and to a servo unit 24. The reproducing unit 20 is constituted by a waveform equalizing circuit, an automatic gain control circuit, a binary circuit, etc. and converts the reproduction signals that are input into binary signals. Binary signals from the reproducing unit 20 are input to a PLL (phase-locked loop) circuit 21 for self-clocking. The reproduction clocks obtained by the PLL 21 in synchronism with the binary signals and the binary signals are input to a discriminator 22 for discriminating the data. The resulting data discrimination signals are input to the controller 16 where the data are demodulated. In the magneto-optical disk device which records, reproduces and erases the data using a magnetic field applied from an external unit, provision is made of an external magnetic field generator 7, the direction of the magnetic field is changed during the recording or erasing, and the recording medium is irradiated with a recording power or an erasing power, to record, reproduce or erase the data. During the reproduction, furthermore, the reflected light is divided into p-polarization and s-polarization by a wavelength plate (not shown) disposed in front of the photo detector 9, and the polarized beams are differentiated by the photo detector (division into two) 9 to obtain magneto-optical signals. By using a cylindrical lens (not shown) disposed in front of the photo detector 9 and the photo detector (division into four) 9, furthermore, there can be obtained a focus error signal and a track error signal.

According to the present invention, the trial writing data are recorded prior to the normal recording, and are reproduced and evaluated and, then, the normal recording is effected after the recording conditions are optimized.

Described below is the operation for optimizing light power. Trial writing data are recorded while changing the light power, and are reproduced and evaluated. To evaluate the trial writing data, reproduction signals in an analog state are guided from the reproducing unit 20 into a trial writing discriminator 23. The trial writing data are made up of a most dense pattern having the highest frequency in the apparatus and a least dense pattern having the lowest frequency in combination. In the signals reproducing the trial writing data, the center level of the most dense pattern and the center level of the least dense pattern are detected by the trial writing discriminator 23. A difference between these center levels is detected by the controller 16, the recording power with which the difference becomes zero is judged to be the optimum recording power, and normal recording is carried out. The above-mentioned operation makes it possible to set the optimum power at all times and to record the recording marks maintaining high precision.

Described next is the operation for optimizing the servo control operation. Based upon a focus error signal and a track error signal from the reproducing amplifier 19, a servo unit 24 drives the actuator 5 to control the position of the light spot. In recording the trial writing data for optimizing the servo (focusing and tracking), the focus error signal and the track error signal of the servo unit 24 are monitored by the controller 16, an electric offset is applied in the forcing and tracking directions while maintaining the recording power fixed, and the recording is accomplished by changing the position of the light spot. The recording pattern is reproduced and evaluated in the same manner as when the light power is optimized. As a result, an optimum electric offset quantity is set to the servo making it possible to control the position of the light spot in an optimum manner.

Operations for optimizing the light power and for optimizing the servo control may be carried out separately, but further increased effects are obtained when these operations are carried out in combination as described below.

Figure 2:
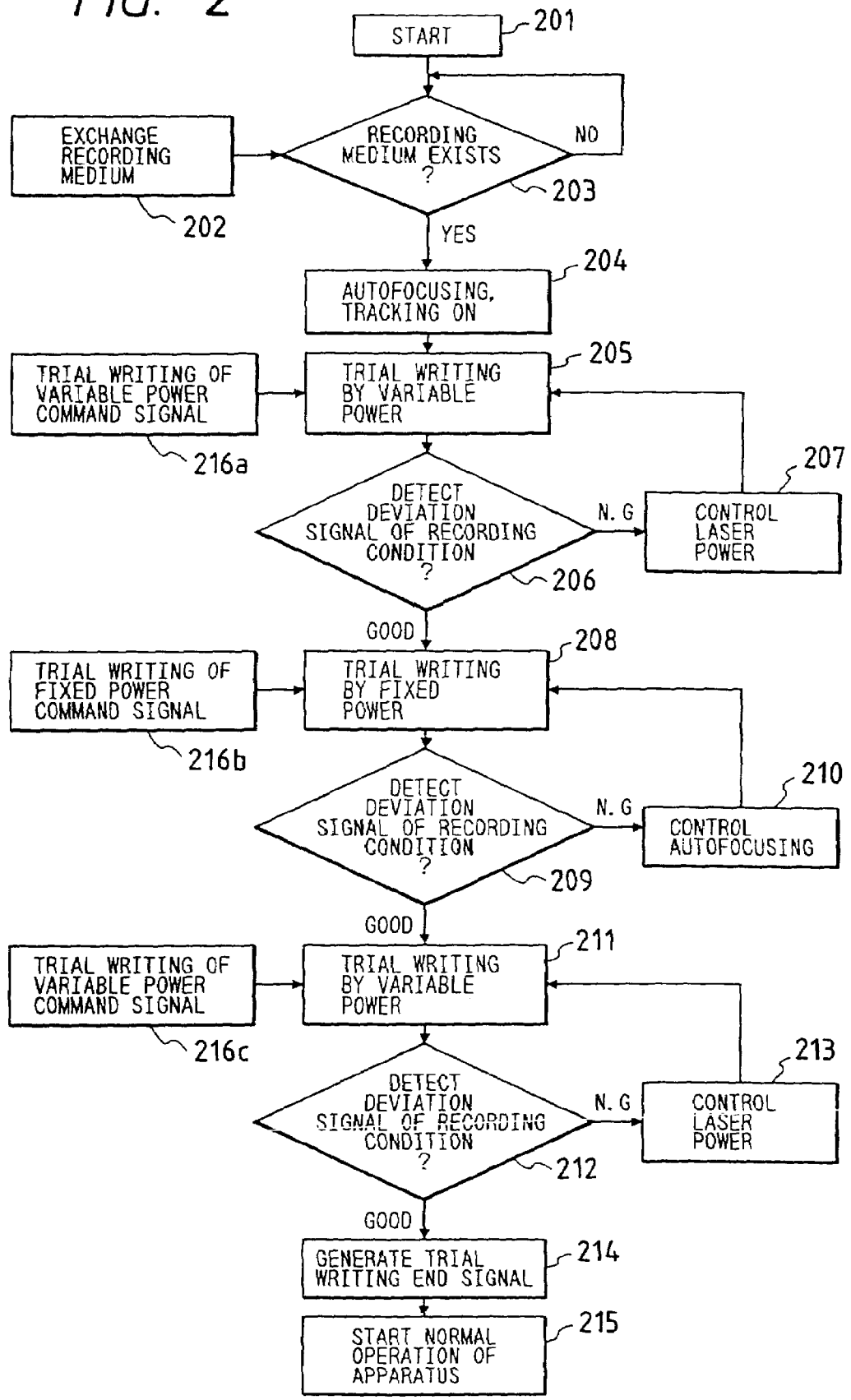
FIG. 2 is a flow chart explaining a procedure of trial writing processing.

FIG. 2 is a flow chart illustrating the procedure of operation according to the present invention.

The power supply circuit of the apparatus is closed to operate the apparatus (201). As required, the medium is replaced (202). The apparatus judges whether the recording medium has been introduced in the apparatus or not (203), and stands by when the recording medium has not been introduced. When the recording medium has been set to the apparatus, the recording medium is rotated and the laser beam is emitted. Then, the servo (autofocusing: AF, tracking: TR) operation is started to control the light spot (204). The servo operation follows a target point (state in which error signal is electrically suppressed) of the apparatus, and is not always placed in an optimum state with respect to the practical operation for reproducing or erasing the recording.

Trial writing is effected and is evaluated in order to confirm the matching between the recording medium that is set and the apparatus. According to the present invention, the trial writing sets the conditions so as to minimize a change in the recording mark caused by a change in the recording sensitivity for the recording medium due to a change in the thickness of the recording medium and a change in the ambient temperature, or caused by a change in the relative recording sensitivity due to a change in the conditions of the apparatus (condition where the laser beam is emitted, condition of controlling the position of the light spot, etc.). Concretely speaking, there are included primary and secondary trial writing with variable power for optimizing the recording power (205, 211), and trial writing with fixed power for controlling recording pulses and electric offset quantities of AF and TR (208). A recording condition deviation signal is detected from the reproduction signal of trial write data recorded in the trial write processing, and an optimum recording condition is set.

First, in order to determine the recording condition for the recording medium that is set, the primary writing with variable power (205) is effected while maintaining the servo condition unchanged but successively changing the recording power. The trial write data that are recorded are reproduced and are evaluated to detect a recording condition deviation signal (206), and the laser power is controlled until the deviation signal lies within an allowable range (207). When the deviation signal lies within a predetermined range, the primary optimum power is determined. It is thus allowed to set the power near the final optimum power.

Next, the primary optimum power is fixed, and the trial writing with fixed power (208) is carried out while successively changing the electric offset quantity of AF. The trial writing data are the same as those that were recorded in the primary trial writing with variable power. In reproducing the trial writing data, a recording condition deviation signal is detected (209) without applying electric offset of AF. In a state where the recording power is fixed, the offset quantity is changed until an optimum AF offset is accomplished during the recording (210). When an optimum AF state is accomplished, the recording temperature of the recording medium becomes the highest and the recording marks become large. This property is utilized to form a recording condition deviation signal, and an optimum electric offset quantity during the recording is determined in order to realize an optimum servo state. When it is so judged that the servo state is without offset, the primary optimum recording power is regarded to be the final optimum recording power, and a trial writing end signal is output. These operations are controlled based upon instructions 216a, 216b and 216c from the controller 16.

After the optimum servo state is realized, the secondary trial writing operation is carried out again (211, 212, 213) to change the recording power, and the final optimum recording power is determined. The procedure for this operation is the same as the primary trial writing operation. After the final optimum recording power is determined, the trial writing end signal is output (214) to start the operation for recording, reproducing or erasing normal data (215).

When it becomes no longer possible to correctly record or reproduce the data during the operation for recording, reproducing or erasing normal data, the above-mentioned trial writing is effected again to again set an optimum recording power. When the recording medium is not replaced and when the power supply is not interrupted, the secondary trial writing with variable power only may be effected to determine the final optimum recording power. When the recording medium is replaced and the power supply is interrupted, the above-mentioned trial writing is carried out. This makes it possible to strikingly improve compatibility of the recording media and the apparatus, as well as to highly densely record the data and to improve reliability.

Though the trial writing with fixed power of this embodiment has dealt with the case of autofocusing, the offset quantity of tracking may be optimized in its place. After the autofocusing is optimized, the power may be fixed again and the TR offset quantity may be optimized to optimize both of them.

Figure 3:
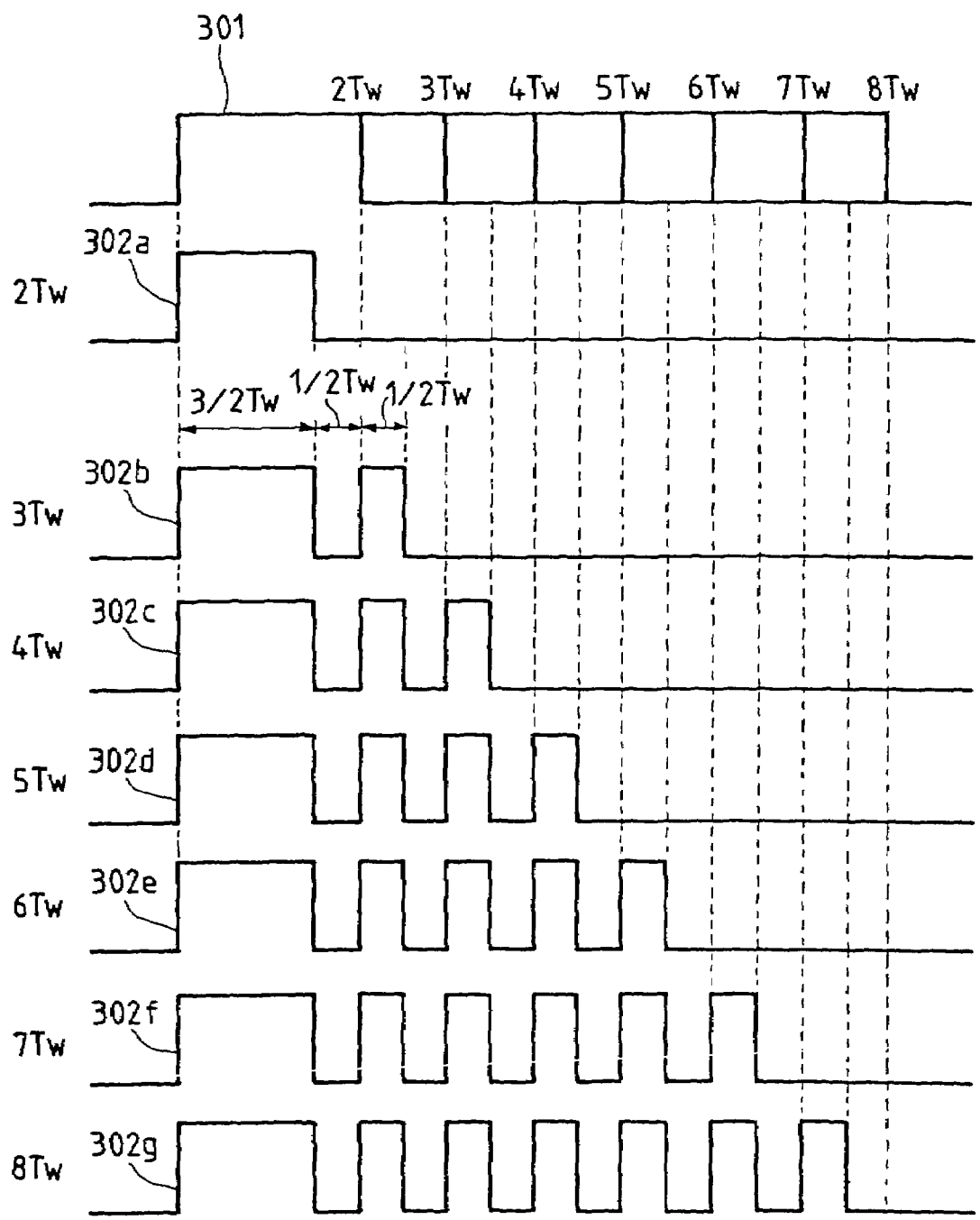
FIG. 3 is a diagram explaining sequences of recording codes and sequences of recording pulses used in the invention.

FIG. 3 illustrates a recording system for recording the data into a recording medium according to an embodiment of the present invention. Described below is a case where (1, 7) RLL codes are used as a modulation system. The outputs of the selector 12 are corresponded to a sequence of recording codes relying upon a sequence of codes modulated depending upon normal data from the controller 16 and a sequence of codes from the trial writing unit 15 described with reference to FIG. 1.

In the case of the (1, 7) RLL codes, there are seven sequences of recording codes 301 of 2Tw to 8Tw, the signals being NRZI (non-return to zero inverse) signals of which the polarities are inverted by "1" of a modulation code for recording mark edge. Here, Tw denotes the width of a window, and a reference clock period oscillated by the synthesizer 14 is equal to Tw. In recording or reproducing the data by turning a 5-inch optical disk at a speed of 3000 rpm, if the length of a recording pit is 0.75 μm, the transfer speeds of 2 MB/s along the inner circumference and 4 MB/s along the outer circumference can be realized with (1, 7) RLL codes. In this case, Tw becomes a time of 40 ns along the inner circumference and 20 ns along the outer circumference. The recording waveform forming unit 11 generates sequences of recording pulses 302a to 302g corresponding to pulses of sequences of recording codes. In the sequence of recording pulses, the head pulse and the second and succeeding pulses have different lengths. The head pulse has a width of 3/2Tw with respect to the shortest pulse width 2Tw, which is shorter by ½Tw. The pulse width of 3Tw and onwards is obtained by adding up a combination of the head pulse 3/2Tw, the pulse width ½Tw of the second and subsequent pulses and a gap width ½Tw (same as a reference clock waveform). These pulses are generated in synchronism with reference clocks. Thus, the pulse width and the pulse gap are controlled maintaining improved precision.

Figure 4:
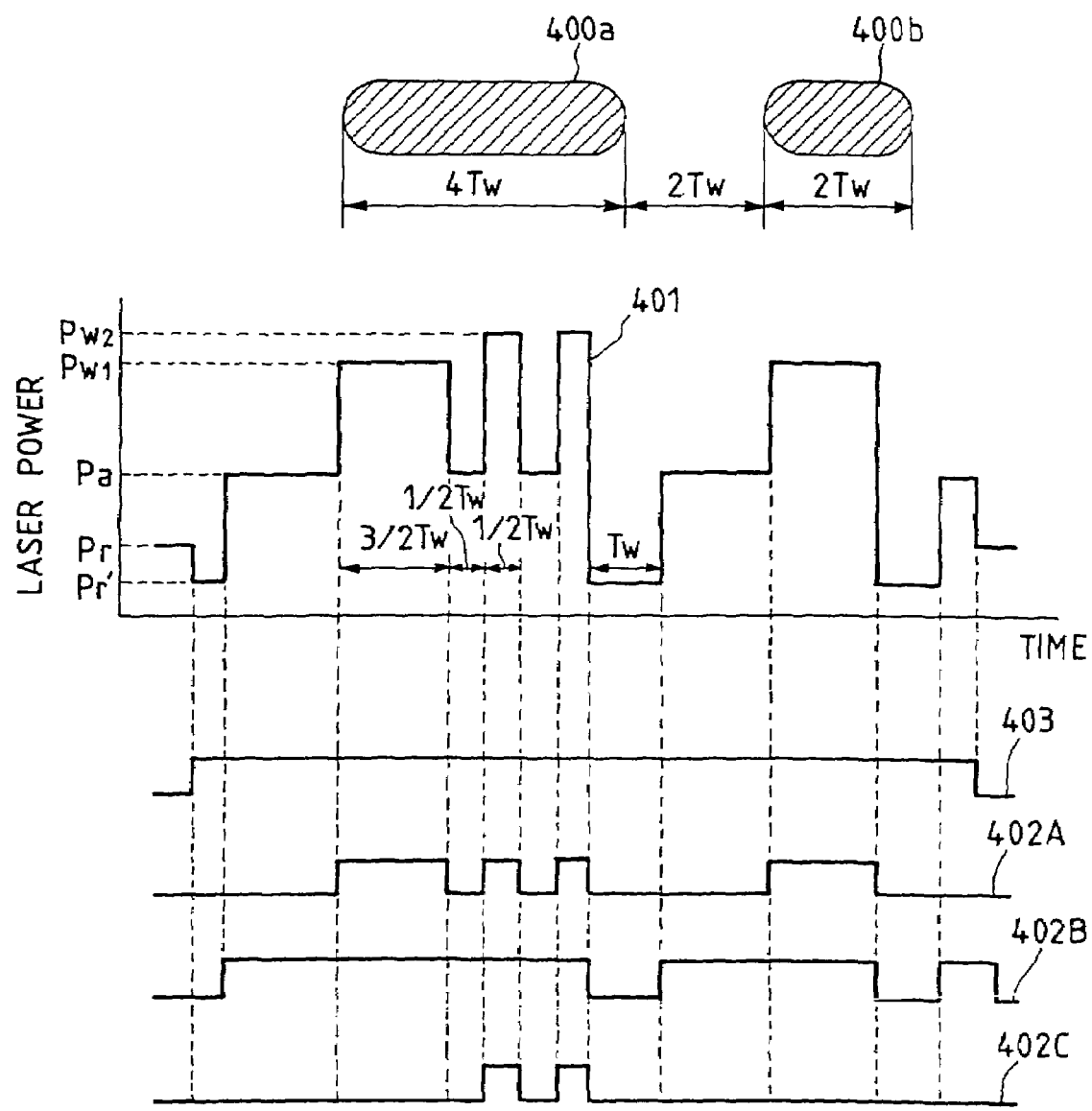
FIG. 4 is a diagram explaining waveforms of recording marks and recording waveforms.

FIG. 4 shows shapes of recording marks recording into the medium in the present invention, recording waveforms for recording the marks and control signals.

The recording waveform 401 of laser beam for forming the recording marks 400a, 400b are constituted by a combination of recording pulse sequences (control signals) 402A to 402C. The recording pulse sequence 402B has a rest period of, for example, a time width Ts from the rear edges (corresponds to rear edges of marks 400a, 400b) of the recording pulse sequences 402A and 402C. As described above, a gap of a given time width is provided from the falling position of the recording code sequence of the recording waveform 401, so that the heat from the final falling position of the recording pulse sequence will not almost affect the temperature at the first rising position of the next recording pulse sequence. The recording gate 403 sets a range of recording region.

The laser power of the recording waveform 401 has five power levels. That is, reproduction power Pr during the reproduction, reproduction power Pr' of when the reproduction power is lowered by the amount of demodulation to discontinue the superposition of high frequencies during the recording, recording power Pa by the recording pulse sequence B, recording power Pw1 by the recording pulse sequence A, and recording power Pw2 by the recording pulse sequence C (second and succeeding pulses). During the reproduction, the power monitor unit 18 monitors a change in the reproduction power, and feeds the change back to the laser 1 so that the reproduction power Pr is maintained constant during the reproduction. In this recording waveforms, the power of the head pulse (3/2Tw pulse) is set to be smaller than the power of the succeeding pulses (½Tw pulses). Then, the width of the recording mark by the head pulse is set to be equal to the width of the recording mark by the succeeding pulses, and the length of the recording marks can be highly precisely controlled. This is nothing but to maintain constant the temperature of the recording medium by the head pulse and the temperature by the succeeding pulses. Therefore, the width of the recording marks are set to be constant and, hence, the amplitude of reproduction signals of the data reproduced from the recording medium can be set to be constant. Binary signals are formed by directly slicing the reproduction signals at the center or at a given level thereof.

By using the recording pulse sequence and auxiliary recording pulses in combination, furthermore, the data can be written in an overlapped manner into a magneto-optical disk which is made of an exchange coupling film and permits the data to be written in an overlapped manner that is disclosed in Japanese Patent Laid-Open No. 175948/1987 by using recording power Pa based on the recording pulse sequence B as erasing power and powers Pw1, Pw2 based on the recording pulse sequences A and C as recording power.

FIG. 5 illustrates an example for detecting a trial writing pattern. As the trial writing pattern, use is made of the most dense pattern (2Tw in the case of the (1, 7) RLL codes) having the highest frequency in the apparatus and the least dense pattern (8Tw) having the lowest frequency in a repetitive manner. In the case of the mark-edge recording in which an edge portion of the mark represents the data, it is important to control the time axis of the recording marks (length in the tracking direction). When the center levels of the reproduction signals are equal between the most dense pattern and the least dense pattern, it means that the time axes of the patterns are controlled and it is desired that the recording power at this moment is regarded to be the optimum power. In this embodiment as described above, a change in the time axis is detected in terms of a change in the level of amplitude.

Figure 5A:
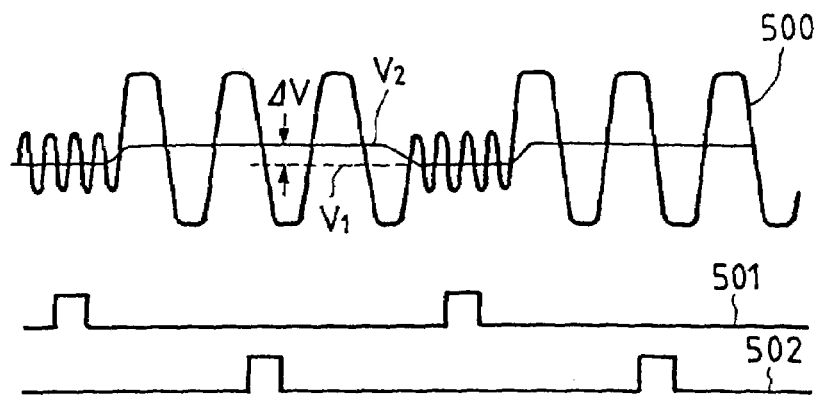
FIGS. 5a, 5b, and 5c are graphs explaining examples of detection in the trial writing with a variable power and with a fixed power.

FIG. 5a shows reproduction signals that are obtained when the above-mentioned trial writing pattern is recorded and reproduced under given conditions. The trial writing discriminator 23 of FIG. 1 detects a center level (V1) of the most dense pattern out of the reproduction signals and a center level (V2) of the least dense pattern, thereby to find a voltage difference $\Delta V = V1 - V2$. The timing for detecting the center level V1 of the most dense pattern is determined by a sample pulse 501, and the timing for detecting the center level V2 of the least dense pattern is determined by a sample pulse 502. The voltage difference $\Delta V$ is input as a recording condition deviation signal to the controller 16 in order to find a condition in which $\Delta V$ becomes zero.

Figure 5B:
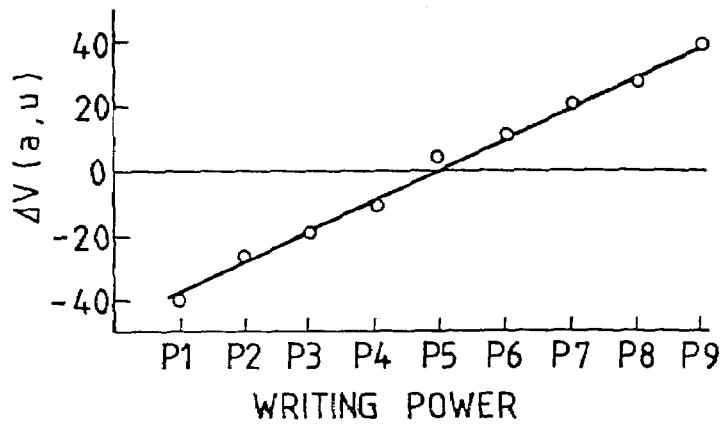

FIG. 5b illustrates an example of evaluating the trial writing with varying power. In detecting the trial writing with varying power, the recording power is successively raised from P1 to P9. During the reproduction, the voltage difference $\Delta V$ corresponding to the recording power can be found in a manner as explained with reference to FIG. 5a. The recording power P5 with which $\Delta V \approx 0$ is determined by the controller 16 as the optimum recording power.

Figure 5C:
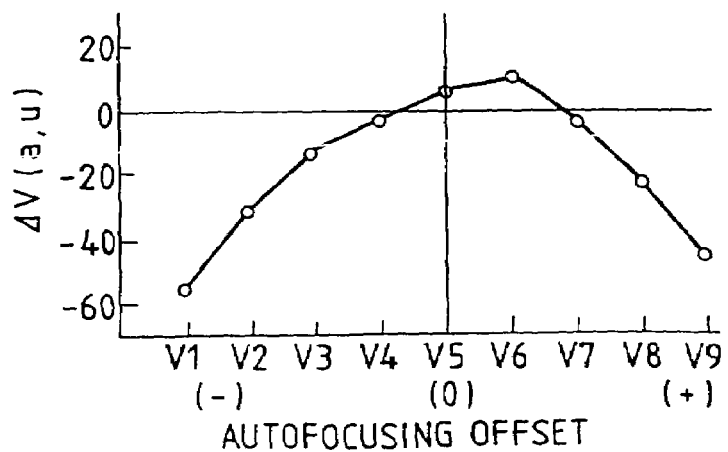

FIG. 5c illustrates an example of evaluating the trial writing with fixed power. In the trial writing with fixed power for optimizing the servo condition, the voltage difference can be detected by recording and reproducing the data while changing the servo condition but maintaining the recording power (P5) determined in FIG. 5b unchanged.

In this embodiment, the AF offset quantity is changed from V1 to V9. In this case, the state where the apparatus has no electric offset quantity is regarded to be V5. The energy of laser beam effectively flows into the recording medium in a state where the light spot is most squeezed. Even when the recording power is fixed, therefore, $\Delta V$ has a maximum value. By judging the maximum value using the controller 16, therefore, the servo state can be optimized. In this case, the AF offset quantity V6 is selected by the controller 16. Next, the controller 16 so instructs the servo circuit 24 that the AF offset becomes V6, and the servo unit 24 drives the actuator 5. In this state, the trial writing with variable power is effected again as shown in FIG. 5b, and the recording power is determined and is regarded to be the final optimum recording power. By executing such an operation, the optimum recording power and the optimum servo state are realized.

Figure 6:
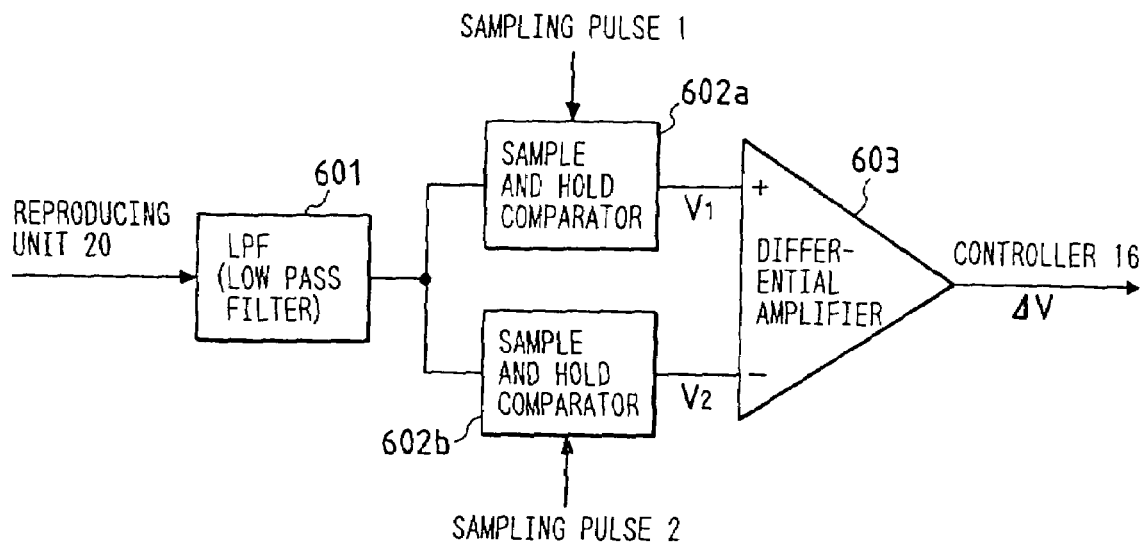
FIG. 6 is a block diagram of a circuit for detecting a trial writing pattern center level according to the first embodiment.

FIG. 6 illustrates the trial writing discriminator 23 according to the embodiment. Here, a low-pass filter 601 is provided for the reproduction signals from the reproducing unit 20 in order to detect an average level in the reproduction signals. Thereafter, the center levels V1 and V2 are detected by two sample-holding circuits 602a and 602b as average levels for the respective patterns. The center levels V1 and V2 are input to a differential amplifier 603 where a voltage difference ΔV (recording condition deviation signal) is detected and is output to the controller 16.

Figure 7A:
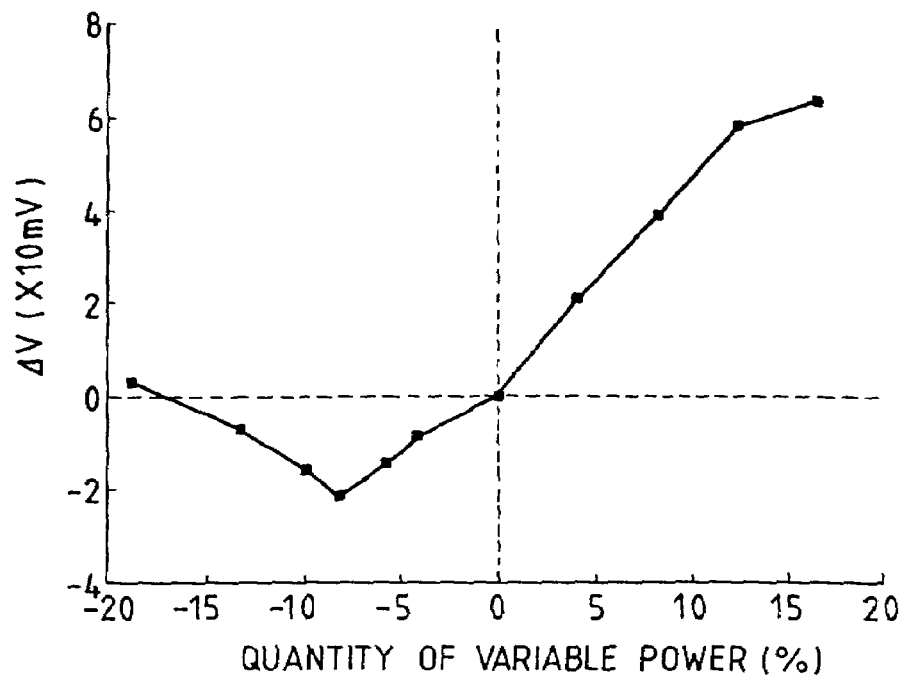
FIGS. 7a and 7b are graphs of measurement of trial writing with a variable power and with a fixed power.
Figure 7B:
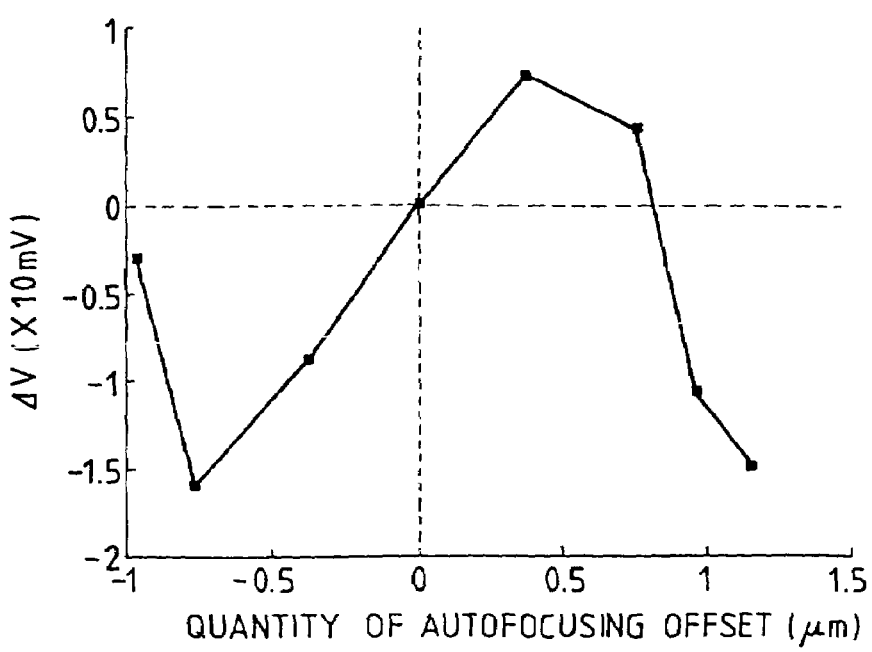

FIG. 7 illustrates an example of measuring the trial writing, and wherein FIGS. 7a and 7b show measured values corresponding to those of FIGS. 5b and 5c. Experimental conditions were as follows:
Laser wavelength: 780 nm
Numerical aperture: 0.55
Recording medium: Magneto-optical disk
Number of revolutions: 3000 rpm
Linear velocity: 9.4 m/s
Width of detecting window: 40 ns Under the above-mentioned conditions, the voltage difference ΔV shown in FIG. 5a was measured by changing the recording power, and the data were obtained as shown in FIG. 7a. The optimum power was when the amount of change of power was 0% and, hence, this power was normalized. The recording power levels at this moment were Pa=3.51 mW, Pw1=5.51 mW and Pw2=5.71 mW. The state ΔV≈0 was obtained when the amount of change of power was about 20%. However, this power was that of when the recording was started and was not an optimum power. When the controller 16 judges that ΔV≈0, a power value is detected at which ΔV changes from a negative value into a positive value in order to prevent erroneous operation.

Next, FIG. 7b shows the results of when the AF offset quantity was changed by using recording powers (Pa=3.51 mW, Pw1=5.51 mW, Pw2=5.71 mW) detected in FIG. 7a. In the apparatus used in the experiment, the voltage difference ΔV of when the AF offset quantity was 0 μm did not assume a maximum value but assumed a maximum value when the AF offset quantity was about 0.4 μm. It was therefore learned that the optimum state of servo was when the AF offset quantity of 0.4 μm was applied. This servo state was realized and the trial writing with varying power was effected again (not shown). As a result, ΔV≈0 was realized when the recording power was set to a value which was smaller by about 4%.

Through the above-mentioned procedure, the recording conditions for the recording medium and apparatus could be optimized.

Figure 8:
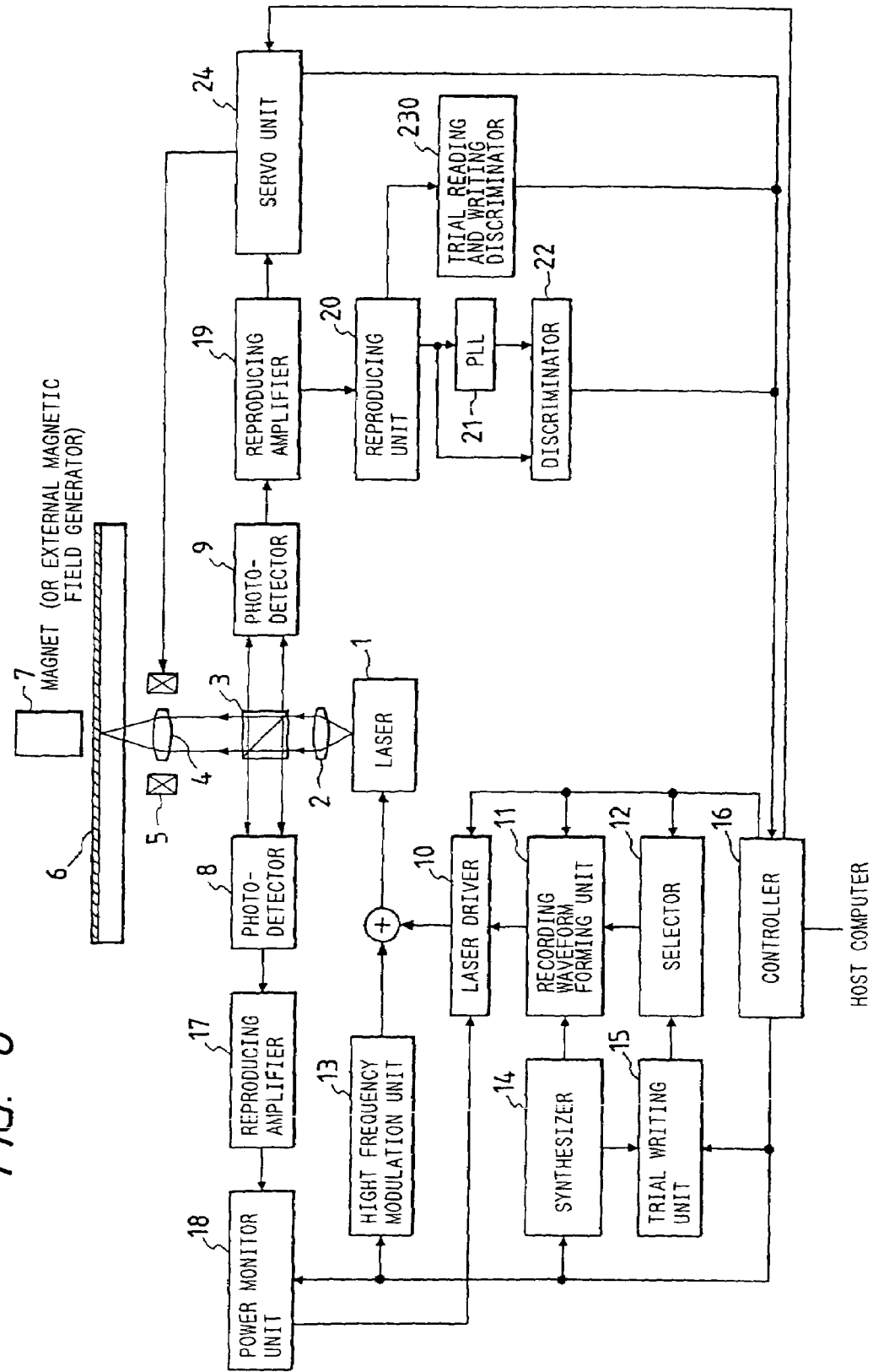
FIG. 8 is a block diagram for explaining the first embodiment of the present invention.

FIG. 8 illustrates another embodiment. The fundamental constitution is the same as that of the embodiment of FIG. 1, and its details are not described. This embodiment, however, has a trial writing/trial reading discriminator 230 and effects the trial reading making a difference from the aforementioned embodiment.

The trial reading is effected prior to reproducing normal data. In the normal reading operation, a reproduction signal in an analog form is guided from the reproducing unit 20 to the trial reading/trial writing discriminator 230. In the reproduction signals (combination of the most dense pattern having the highest frequency and the least dense pattern having the lowest frequency) from the trial reading pattern recorded in advance in the recording medium 6, the center level of the most dense pattern and the center level of the least dense pattern are detected by the trial reading/trial writing discriminator 230, and a difference between the center levels is detected by the controller 16. The servo state of when the difference assumes a maximum value is judged to be an optimum servo state, and the normal reproduction is carried out. When the recording operation is carried out after the reproduction, the trial writing operation may be carried out as explained with reference to FIG. 2.

Figure 9:
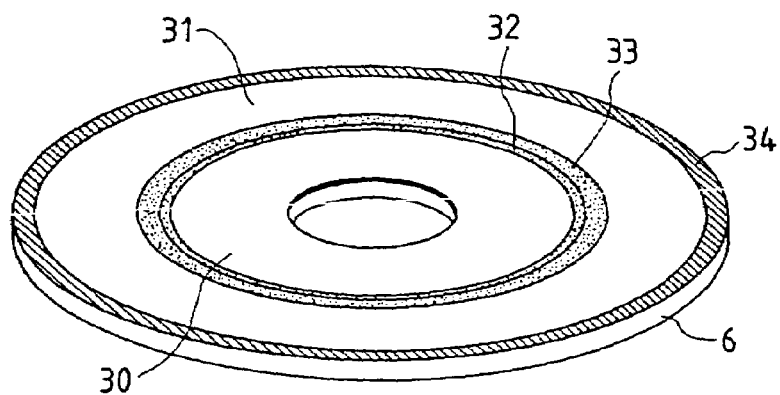
FIG. 9 is a perspective view of a recording medium of the present invention.

Described below with reference to FIG. 9 is the recording medium according to the embodiment of the present invention.

The recording medium 6 is constituted by a read-only region (ROM region: read only memory region) 30 and a recording/reproducing region (RAM region: random access memory region) 31, the ROM region 30 being provided with a trial reading region 32 and the RAM region 31 being provided with trial writing regions 33, 34. In reproducing the ROM, the reproducing conditions are optimized by using a trial reading pattern in the trial reading region 32 prior to reproducing the data. In reproducing the RAM, different reproduction conditions are often necessary. Therefore, the trial reading is effected by using a trial writing pattern recorded in the trial writing region, in order to optimize the reproducing conditions.

The trial writing region must be provided in a number of at least one in the RAM region 31. By providing the trial writing regions in a plural number, the frequency characteristics (recording pulse rising characteristics, etc.) can be sufficiently guaranteed.

Figure 10:
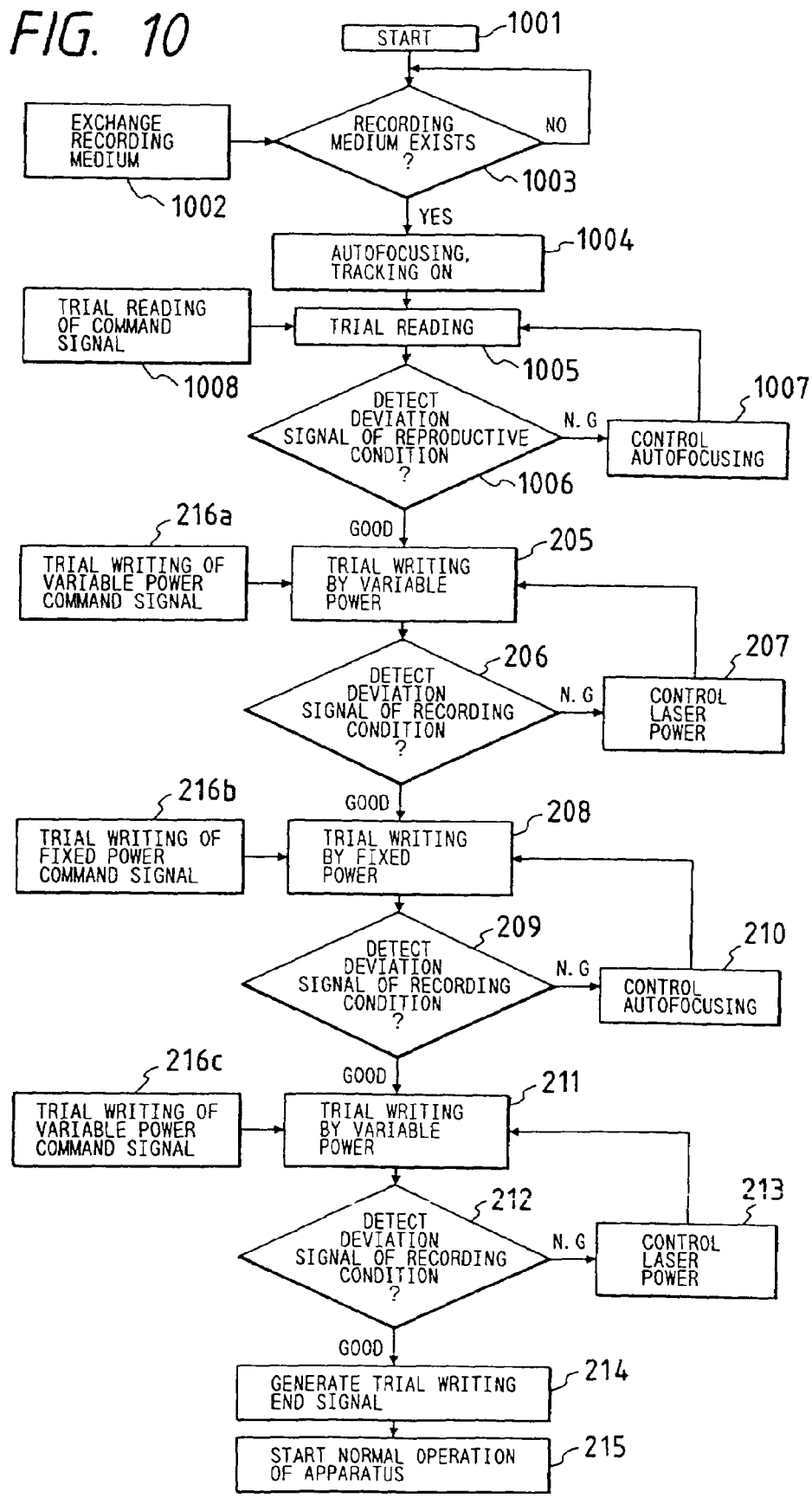
FIG. 10 is a flow chart of a procedure of the trial writing processing.

FIG. 10 is a flow chart explaining the procedure of trial reading/trial writing processing according to the present invention.

The power supply circuit of the apparatus is closed to operate the apparatus (1001). As required, the medium is set or is replaced (1002). The apparatus judges whether the recording medium has been introduced in the apparatus or not (1003), and stands by when the recording medium has not been introduced. When the recording medium has been set to the apparatus, the recording medium is rotated and the laser beam is emitted. Then, the AF servo or the TR servo is started to control the light spot (1004). The servo operation follows a target point (state in which error signal is electrically suppressed) of the apparatus, and is not always placed in an optimum state with respect to the practical operation for recording, reproducing or erasing the data. Trial writing and trial reading operations are effected in order to confirm the matching between the recording medium that is set and the apparatus.

In order to correctly reproduce the data that have been recorded in advance according to this embodiment, the trial reading operation is carried out (1005) in order to optimize the servo state of the reading apparatus. Typical data that have been recorded in advance are those data recorded in the ROM medium or the data recorded in the ROM region 30 of the medium of the type of ROM/RAM mixture shown in FIG. 9. Not only ruggedness signals are used for producing the recording medium but also the invention is adapted for properly reproducing the data in the RAM region recorded by other apparatus as low-order compatibility.

The trial write processings 205 to 215, 216a to 216c of this embodiment are the same as those explained with reference to FIG. 2, and are denoted by the same reference numerals but their description is not repeated. In the ROM/RAM mixed medium shown in FIG. 9, the two kinds of servo states, i.e., the servo state of the ROM region and the servo state of the RAM region are stored in the controller 16, and are changed depending upon the regions to record and reproduce the data.

The trial reading/trial writing discriminator 230 may be constituted in the same manner as the circuit shown in FIG. 6.

Figure 11A:
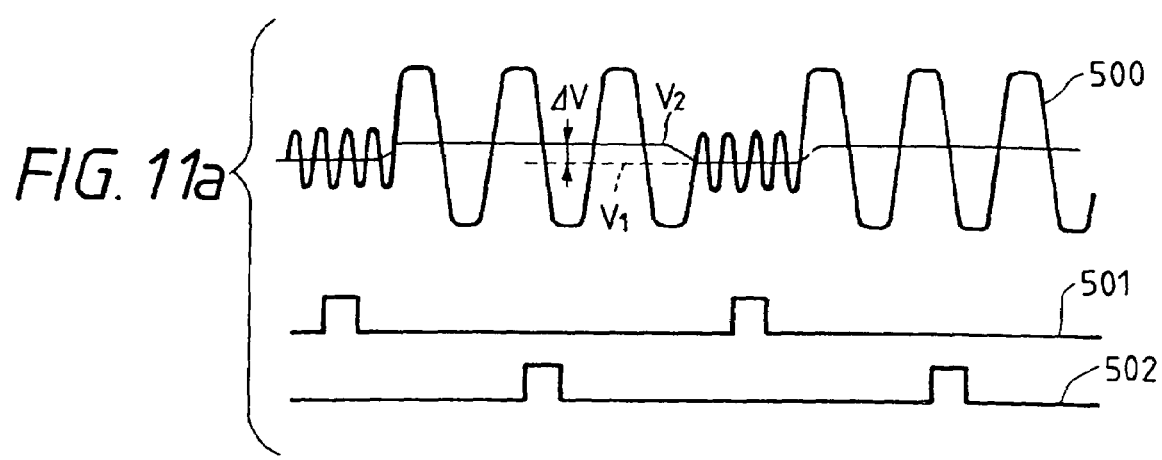
FIGS. 11a and 11b are diagrams explaining examples of detection in the trial reading.
Figure 11B:
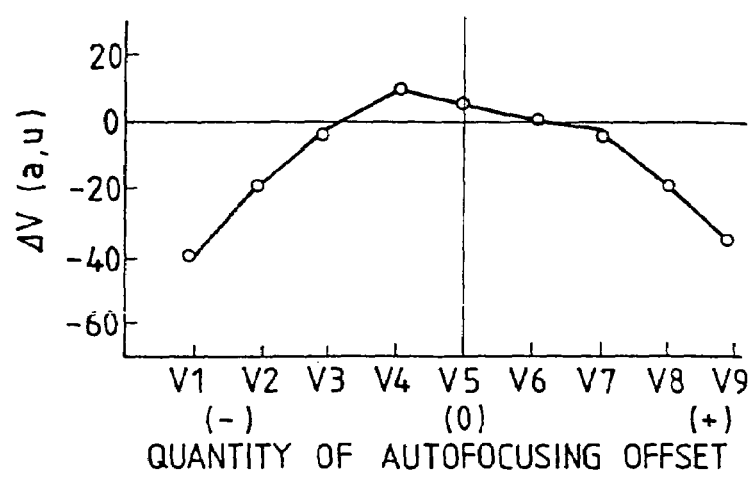

FIG. 11 illustrates an embodiment for detecting a pattern relying upon the trial reading. The operation is nearly the same as the operation for detecting the trial writing pattern explained with reference to FIG. 5, and is not described here again though the same reference numerals are put thereto. In FIG. 11a, however, a reproduction signal 500 is the one that has been recorded in advance in the recording medium 6. In FIG. 11b, the operation is the same as that of FIG. 5c. In this embodiment, the AF offset V4 assumes a maximum value making it possible to detect an optimum reproduction servo state.

This embodiment makes it possible to suppress a change in the recording sensitivity for the recording medium caused by a change in the thickness of the recording medium or a change in the ambient temperature, to suppress a change in the recording sensitivity of the recording/reproducing apparatus, to improve compatibility between the recording/reproducing apparatus and the recording medium, to highly precisely control the recording marks, and to minimize the erroneous operation during the production caused by variance among the apparatuses. Thus, the embodiment makes it possible to improve reliability of the recording/reproducing apparatus, to increase the recording capacity and to increase the rate of transferring the data.

Figure 12:
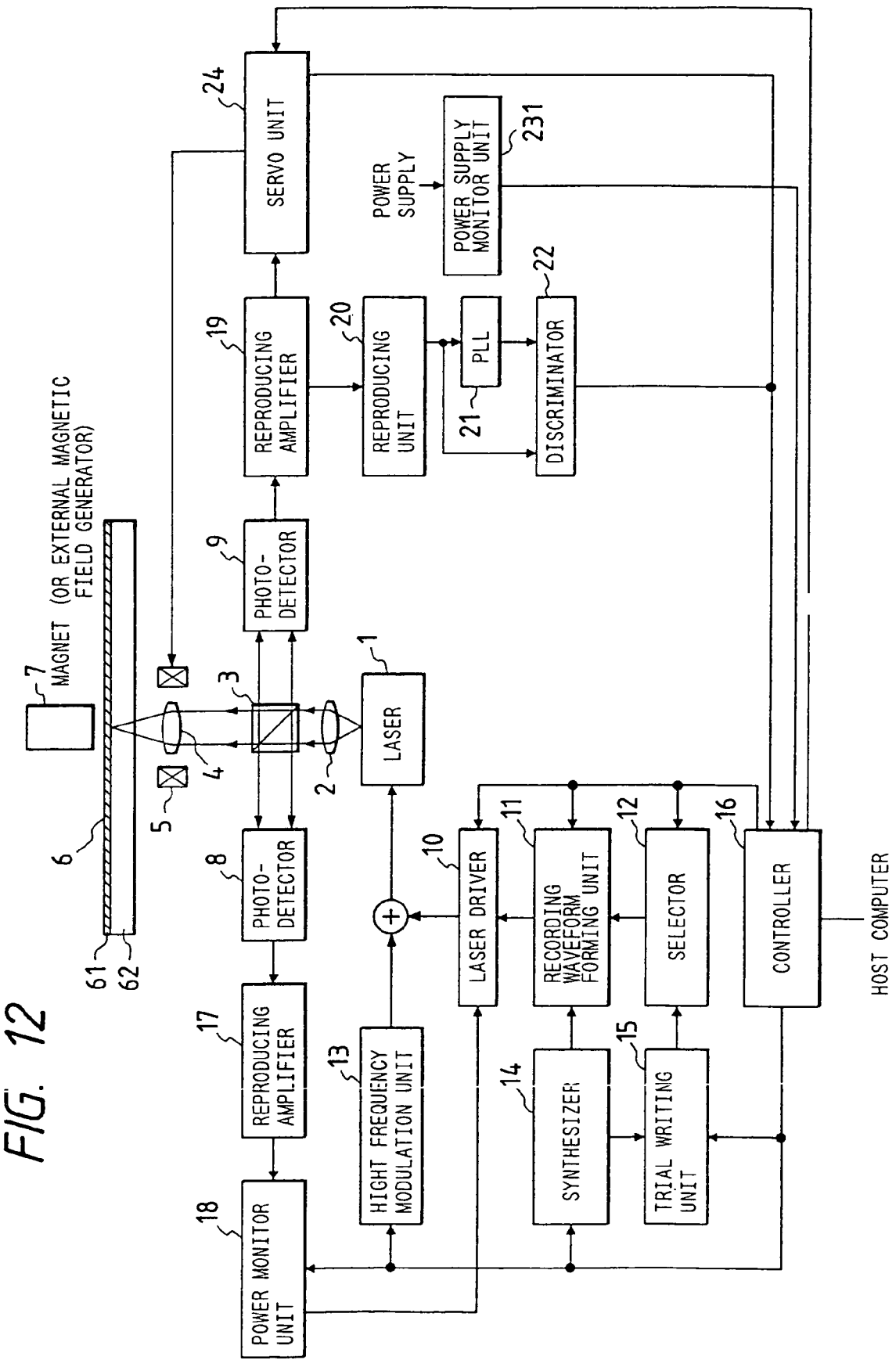
FIG. 12 is a block diagram for explaining the embodiment of the present invention.

FIG. 12 illustrates the data recording/reproducing apparatus according to a further embodiment of the present invention.

The fundamental constitution is the same as that of the embodiment of FIG. 1 and its details are not described here. Described below are characteristic items of the embodiment.

The mark length recording system is employed, and a record control method is employed in which a plurality of kinds of pulses having different widths and levels are superposed one upon the other to control the laser power. Furthermore, a ZCAV (zoned constant angular velocity) recording method is employed in which a reference clock is changed for every zone of the magneto-optical recording medium to nearly uniformalize the recording density between the inner circumference and the outer circumference, in order to increase the capacity.

Described below is the operation during the recording with reference to FIGS. 12 and 13.

Commands and data from the host computer are decoded and demodulated through the controller 16, and are converted into a sequence of codes corresponding to the modulation system. The synthesizer 14 is an oscillator for generating reference clocks 300 for the whole apparatus. Since the ZCAV recording method is employed, the oscillation frequency of the synthesizer 14 varies depending upon the zone. In this embodiment, the period T of the reference clock 300 is 40 ns in the inner circumference of the magneto-optical disk 6 and is 20 ns in the outer circumference thereof.

In recording the data, the sequence of recording codes 250 modulated depending upon the data from the controller 16 with the clock 300 as a reference is input to the recording waveform forming unit 11. By using the sequence of recording codes 250, the recording waveform forming circuit 11 generates a sequence of binary recording pulses 210a for control which are in synchronism with the clocks of pulses of the recording code sequence 250. The sequence of recording pulses 210a is constituted by two kinds of pulses, i.e., a relatively broad head pulse and relatively narrow succeeding pulses which are in synchronism with the clocks 300. A gap among a plurality of pulses constituting the recording pulse sequence 210a is in synchronism with the gap among the clocks 300. The pulse portion, i.e., the recording code period of the recording code sequence 250 can be set to any integer times of (½)T, wherein T is the period of the clock 300. The recording pulse sequence 210b is constituted by binary pulses corresponding to the succeeding pulses of the recording pulse sequence 210a and by a gap among the pulses. The auxiliary recording pulses 220 are binary pulses constituted by utilizing the fall of the recording code sequence 250 and the clocks 300.

The binary pulses 210a, 210b and 220 give data related to whether the laser power pulse is generated or not, and are input to the laser driver 10 to oscillate the source 1 of laser beam with a large power. The beam emitted from the source 1 of laser beam records the recording marks corresponding to the code sequence on the recording medium 6 in the same manner as explained with reference to FIG. 1.

The laser beam power of a minimum level is the power Pr during the reproduction, the laser beam power of a high recording level is the recording power Pw2 in which the succeeding pulses of the recording pulse sequence 210a and the recording pulse sequence 210b are superposed one upon the other, the laser beam power of an intermediate level is the recording power Pw1 of the recording pulse sequence 210a, and the laser beam output of a low recording level is the recording power Pa of the auxiliary recording pulses 220. The magnitudes of the recording power Pw2 and the recording power Pw1 shown in FIG. 13 may be reversed or may be equal depending upon the thermal characteristics of the recording medium.

The laser drive pulses are obtained by synthesizing the recording pulse sequences 210a, 210b and auxiliary recording pulses 220, and are constituted by a relatively broad head pulse included in the recording pulse sequence 210a and one or a plurality of relatively narrow pulses formed by superposing succeeding pulses of the recording pulse sequence 210a on the recording pulse sequence 210b. The waveform of the laser drive pulses are close to the waveform of the laser output shown in FIG. 13.

Figure 15:
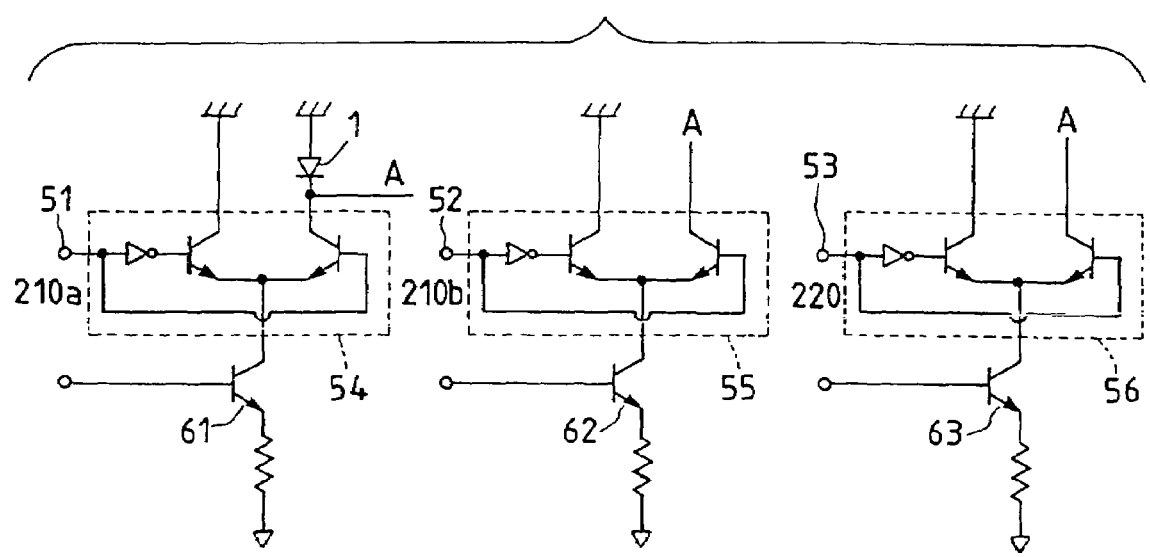
FIG. 15 is a diagram of a laser driver according to an embodiment.

FIG. 15 illustrates an example of the laser driver 10. The recording pulse sequences 210a, 210b and auxiliary recording pulses 220 are input to terminals 51 to 53 of the switching circuits 54 to 56 to control the supply of power to the source 1 of laser beam. Of the power emitted from the source 1 of laser beam, a portion corresponding to (Pw1-Pa) is turned on and off by the recording pulse sequence 210a, a portion corresponding to (Pw2-Pw1) is turned on and off and by the recording pulse sequence 210b, and a portion corresponding to Pa is turned on and off by the auxiliary recording pulses. That is, the irradiated power (Pw1-Pa) is controlled by a base potential of a power transistor 61, the irradiated power (Pw2-Pw1) is controlled by a base potential of a power transistor 62, and the irradiated power Pa is controlled by a base potential of a power transistor 63.

Figure 13:
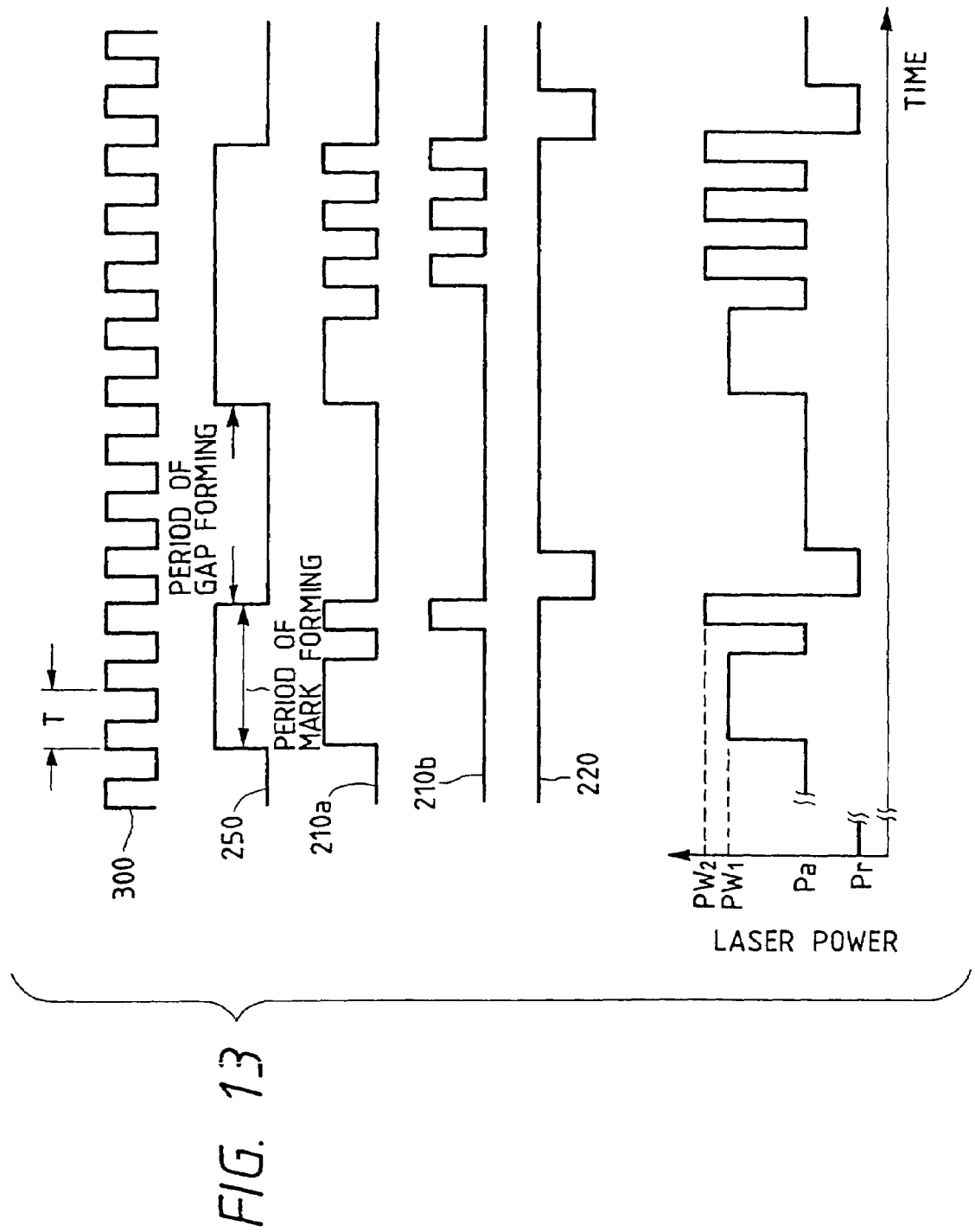
FIG. 13 is a diagram explaining laser drive waveform and laser power.
Figure 14:
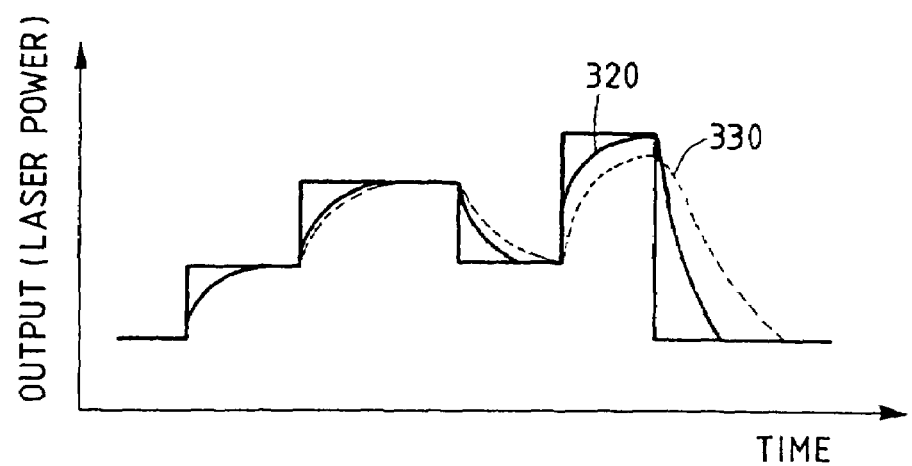
FIG. 14 is a diagram explaining the effect of a change in the power supply voltage upon the laser drive pulse.

As described above, what is most affected by a change in the power supply voltage is the power of high-frequency components, i.e., (Pw2-Pw1) among the laser outputs shown in FIG. 13. By controlling the base potential of the power transistor 62, therefore, the power Pw2 can be increased or decreased with respect to the power Pw1 in order to compensate a change in the recording power caused by a change in the supply voltage. It is, of course, allowable to control base potentials of all power transistors 61 to 63.

In order to compensate the effect of a change in the power supply during the recording in FIG. 12, provision is made of a voltage monitor unit 231 for monitoring the power supply. The voltage monitor unit 231 monitors the supplied voltage at all times or monitors the supplied voltage just prior to effecting the recording, inputs the measured voltage to the controller 16, and newly instructs a setpoint recording power corresponding to a change in the voltage, i.e., newly instructs a base potential of the power transistor 62 to the laser driver 10 to effect the recording.

Figure 16:
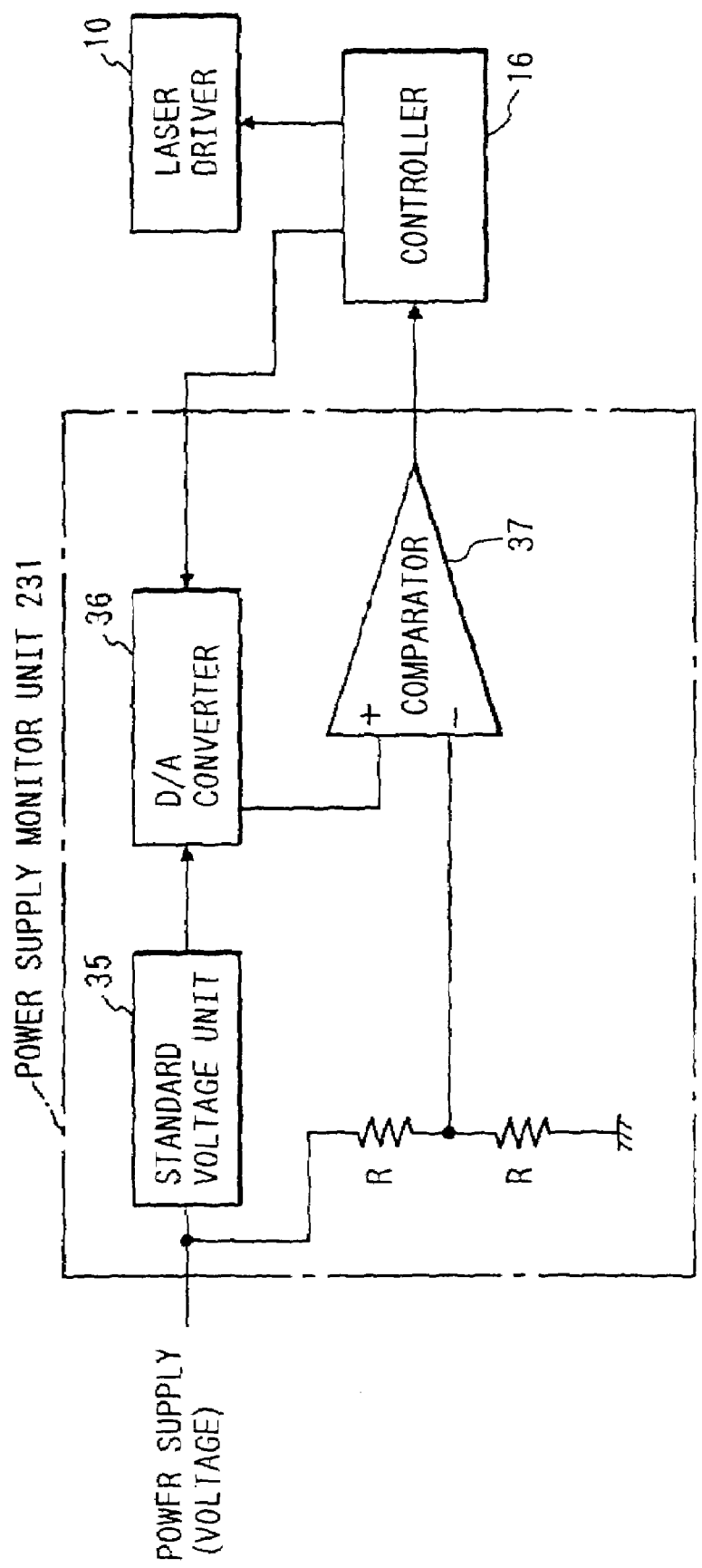
FIG. 16 is a diagram illustrating a power supply monitor unit.

FIG. 16 illustrates an embodiment of the voltage monitor unit 231 which is constituted by a reference voltage forming unit 35, a D/A converter 36 and a compactor 37. The reference voltage forming unit 35 may be constituted by using a Zener diode or the like. The power supply enables the reference voltage forming unit 35 to produce a reference voltage which is input to the D/A converter 36. Based upon the reference voltage, the D/A converter subjects any voltage instructed from the controller 16 to the D/A conversion and outputs it to the comparator 37. The power supply is divided by resistors R, R, and the divided voltage is input to the comparator 37.

When the controller 16 monitors the power source, a series of voltage values are instructed to the D/A converter 36, the series of voltage values starting with a low voltage and increasing each time by a predetermined amount. The comparator 37 compares a voltage from the D/A converter 36 with a voltage divided by the resistors R, R, and outputs a signal to the controller 16 when an instructed voltage has exceeded the voltage that is divided by the resistors. Upon receipt of a signal from the comparator, the controller 16 judges the supplied voltage and instructs a setpoint recording power to the laser driver 10.

Figure 17:
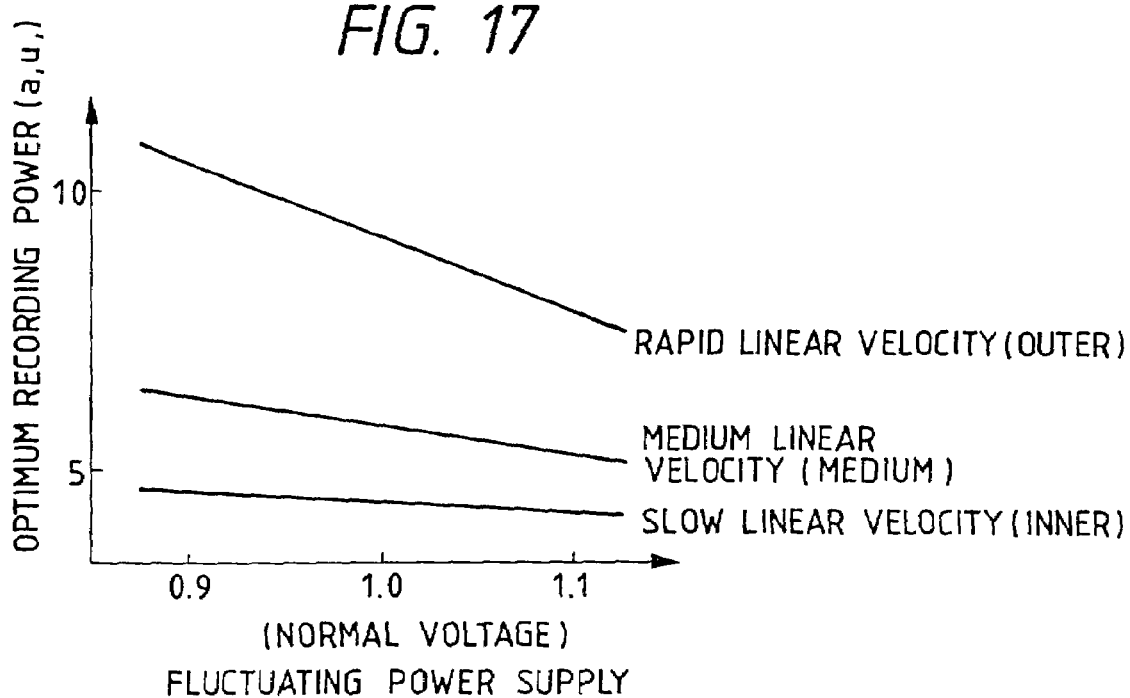
FIG. 17 is a diagram illustrating optimum recording power depending upon a change in the applied voltage.

FIG. 17 illustrates a relationship between the supplied voltage and optimum recording powers during the recording operation. This relationship is obtained by measuring the amounts of change in the power level of recording pulses caused by a change in the power supply voltage applied to the recording apparatus and in the average recording power caused by a change in the pulse width, and by finding the power level of recording pulses with which the recording medium can be irradiated with nearly the same recording power at all times irrespective of a change in the power supply voltage. As will be obvious from FIG. 17, the optimum recording power increases with a decrease in the power supply voltage and further increases with an increase in the linear velocity. It is therefore necessary to monitor the supplied voltage and to change the recording power depending upon the linear velocity.

Figure 18:
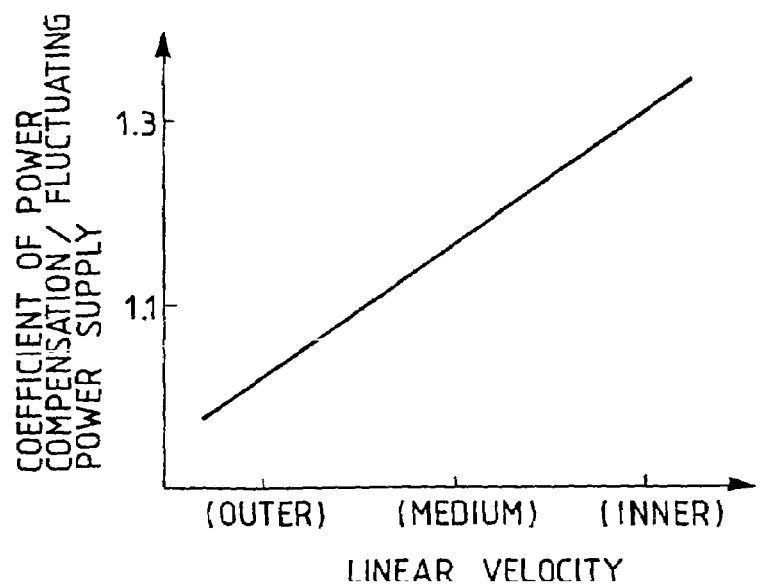
FIG. 18 is a diagram illustrating the linear velocity and the power correction coefficient relative to a change in the applied voltage.
Figures 19A, 19B, 19C:
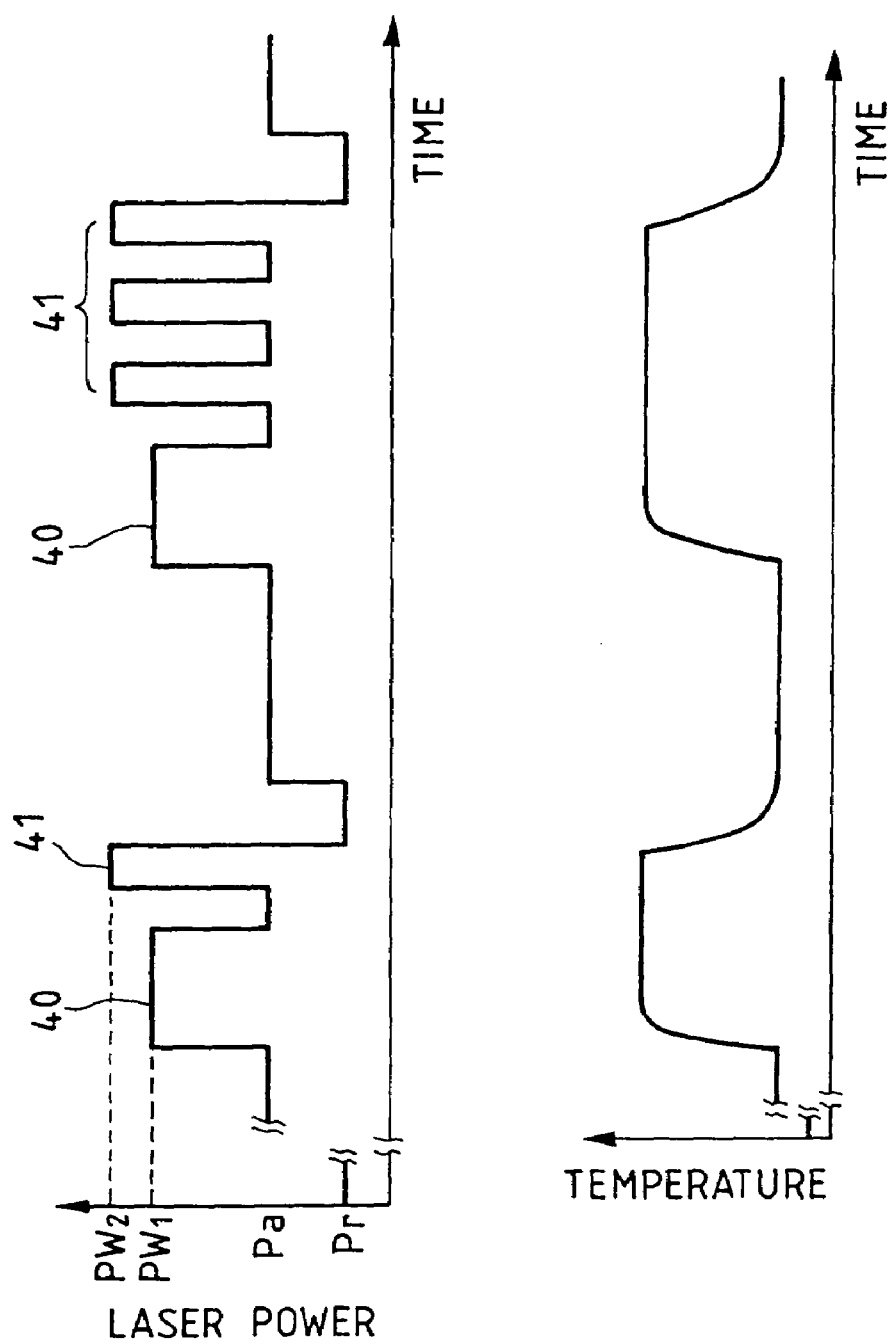
FIGS. 19a, 19b and 19c are diagrams illustrating the record control using multiple pulses.

FIG. 18 illustrates a power correction coefficient with which the controller 16 sets an optimum power to the laser driver 10, wherein the ordinate represents the power correction coefficient relative to a change in the supplied voltage and the abscissa represents the linear velocity. The power correction coefficient must be increased as the recording position comes closer to the outer circumference. By inputting a power correction coefficient shown in FIG. 18 to the controller 16, in advance, an optimum setpoint recording power can be instructed to the laser driver 10 at all times based upon the measured voltage output from the voltage monitor unit 231, and the data can be correctly recorded.

Next, described below in detail is a method of correcting the recording power. Here, the recording surface of the disk-like magneto-optical recording medium 6 is divided into thirty recording zones in the radial direction, and zone numbers 0, 1, 2, - - - , 29 are put to the zones from the side of the outer circumference toward the side of the inner circumference. In this case, the amounts of change (slope) in an optimum recording power when a standard voltage is applied and in an optimum recording power when the power supply voltage is changed are found from FIG. 17 for each of the recording zones, and are stored in the controller 14 in advance in the form of a Table as shown in FIG. 20.

In FIG. 20, Pa(m), Pw1(m) and Pw2(m) represent laser output levels of FIG. 13 for a zone of a number m, and are controlled by the base potentials of power transistors 61, 62 and 63 in the laser driver shown in FIG. 15 as described above. The slope Xm represents the slope of a straight line in FIG. 17 which represents power supply voltage vs. optimum recording power for the zone m.

When the standard voltage of the power supply voltage is denoted by Vn and the power supply voltage as measured by the voltage monitor unit 231 is denoted by Vm, optimum power levels Pa, Pw1 and Pw2 in the zone m are found from the following relations, $Pa = Pa(m),$ $Pw1 = Pw1(m),$ $Pw2 = Pw2 - [(Vm - Vn)/Vn] \cdot Xm$ The controller 16 so instructs the laser driver 10 that the power level of the light pulses emitted from the source 1 of laser beam becomes equal to the optimum power level, thereby to control the laser power.

The operation for reproducing the data is basically the same as that of the embodiment of FIG. 1 and is not described here. This embodiment makes it possible to suppress a change in the recording power caused by a change in the power supply that feeds power to the magneto-optical recording apparatus and to suppress a change in the relative recording sensitivity for the recording medium caused by a change in the width of the pulses, to improve matching between the magneto-optical recording apparatus and the recording medium, to highly precisely control the recording marks, and to improve reliability of the recording/reproducing apparatus and to increase the recording capacity and the rate of transferring the data.

The invention claimed is:

1. In a method of recording data into a recording medium by forming a recording region which is physically different from the nonrecorded portions, an optical data recording/reproducing method comprising:

a first trial writing operation in which trial writing data are recorded into the recording medium while changing the recording power conditions, the recorded trial writing data are reproduced, and the reproduced trial writing data are evaluated to set an optimum recording power; and a second trial writing operation in which trial writing data are recorded into the recording medium while changing the servo conditions, the recorded trial writing data are reproduced, and the reproduced trial writing data are evaluated to set optimum servo conditions;

wherein after the servo conditions are set by said second trial writing operation, a third trial writing operation is performed in which servo conditions are fixed to the recording medium, the trial writing data are recorded while changing the recording power, the recorded trial writing data are reproduced, and the reproduced trial writing data are evaluated to again set an optimum recording power.

2. A method according to claim 1, wherein said first and second trial writing operations are carried out prior to recording the data in order to compensate for a change in the recording sensitivity caused by the recording medium and a change in the relative recording sensitivity caused by the recording apparatus.

3. A method according to claim 1, wherein after the recording power is set by performing the first trial writing operation, the second trial writing operation is performed with the recording power being fixed.

4. A method according to claim 1, wherein in said second trial writing operation, at least two or more kinds of particular recording patterns are used as said trial writing data, and servo conditions with which a deviation signal becomes a maximum between the reproduction signals of said two kinds of particular recording patterns are judged to be optimum servo conditions and are set.

5. A method according to claim 1, wherein in magneto-optically recording said recording data using a laser beam and an externally applied magnetic field, said laser beam is transformed into discrete pulse sequences constituted by two or more kinds of power levels, in order to control the flow of heat diffusing in the recording medium and to control the width and length of magnetic domains that are formed.

6. A method according to claim 5, wherein in performing said first trial writing operation, a plurality of power levels are changed nearly simultaneously.

7. A method according to claim 1, wherein trial reading data are recorded into a medium, said trial reading data are reproduced while changing the servo conditions, and the reproduced trial reading data are evaluated in order to set optimum servo conditions during the reproduction.

8. A method according to claim 7, wherein said trial reading operation is performed prior to performing said first trial writing operation.

9. A method according to claim 7, wherein said recording medium has at least two kinds of regions of a reproduction-only region and a recording/reproducing region, said trial reading data are recorded into said reproduction-only region at the time of producing the recording medium, and said trial reading operation is effected when the medium is reproduced by the reproducing apparatus.

10. A method according to claim 9, wherein trial reading data are recorded into said recording/reproducing region at the time of recording the data, said trial reading operation is effected prior to reproducing the data from said reproduction-only region and from said recording/reproducing region, and optimum servo conditions are varied depending upon said reproduction-only region and said recording/reproducing region.

11. A method according to claim 10, wherein trial reading data are recorded into said recording/reproducing region at the time of recording the data, said trial reading operation is effected prior to reproducing the data from said reproduction-only region and from said recording/reproducing region, and optimum servo conditions are varied depending upon said reproduction-only region and said recording/reproducing region.

12. A method according to claim 7, wherein said trial reading data are recorded into the medium at the time of recording the data, and said trial reading operation is performed prior to reproducing said data.

13. An optical data recording/reproducing method comprising the steps of:
   recording first trial writing data into a recording medium while changing recording power conditions;
   reproducing the recorded first trial writing data;
   evaluating the reproduced first trial writing data to set an optimum recording power;
   recording second trial writing data into the recording medium while changing servo conditions;
   reproducing the recorded second trial writing data
   evaluating the reproduced second trial writing data to set optimum servo conditions;
   fixing the optimum servo conditions to the recording medium after the optimum servo conditions are set;
   recording third trial writing data while changing the recording power;
   reproducing the third trial writing data;
   evaluating the reproduced third trial writing data to again set an optimum recording power.

14. An optical data recording/reproducing method according to claim 13, wherein after the optimum recording power is set the second trial writing data is recording at the optimum recording power.

15. An optical data recording/reproducing method according to claim 14, wherein a laser beam is employed and said laser beam is transformed into discrete pulse sequences constituted by two or more kinds of power levels, in order to control the flow of heat diffusing in a recording medium and to control the width and length of magnetic domains that are formed.

* * * * *